(12) United States Patent
Lang et al.

(10) Patent No.: US 12,038,579 B2
(45) Date of Patent: Jul. 16, 2024

(54) MULTI-REGION IMAGING DEVICE AND METHOD

(71) Applicant: Ningbo Sunny Automotive Optech Co., Ltd., Ningbo (CN)

(72) Inventors: Haitao Lang, Ningbo (CN); Jia Yang, Ningbo (CN); Zhichao Wang, Ningbo (CN); Dingming Yang, Ningbo (CN); Heteng Zhang, Ningbo (CN); Peiyao Wang, Ningbo (CN)

(73) Assignee: Ningbo Sunny Automotive Optech Co., Ltd., Zhejiang (CN)

( * ) Notice: Subject to any disclaimer, the term of this patent is extended or adjusted under 35 U.S.C. 154(b) by 182 days.

(21) Appl. No.: 17/716,578

(22) Filed: Apr. 8, 2022

(65) Prior Publication Data

US 2022/0252878 A1  Aug. 11, 2022

Related U.S. Application Data

(63) Continuation of application No. PCT/CN2020/086083, filed on Apr. 22, 2020.

(30) Foreign Application Priority Data

Oct. 10, 2019 (CN) .......................... 201910958039.7
Dec. 27, 2019 (CN) .......................... 201911375388.2

(51) Int. Cl.
*G02B 27/01* (2006.01)
*G03B 21/00* (2006.01)
(Continued)

(52) U.S. Cl.
CPC ....... *G02B 27/0101* (2013.01); *G03B 21/008* (2013.01); *G03B 21/28* (2013.01); *H04N 9/3147* (2013.01)

(58) Field of Classification Search
CPC ........ G02B 27/0101; G02B 2027/0112; H04N 9/3147
See application file for complete search history.

(56) References Cited

U.S. PATENT DOCUMENTS 10,324,289 B1  6/2019 Henon et al.
2017/0285453 A1*  10/2017 Morant .............. G03B 21/2066
(Continued)

FOREIGN PATENT DOCUMENTS

| CN | 105974584 A | 9/2016 |
| CN | 206057682 U | 3/2017 |

(Continued)

OTHER PUBLICATIONS

Chinese Office Action for corresponding 201910958039.7, dated Aug. 4, 2020.
(Continued)

*Primary Examiner* — Ryan D Howard
(74) *Attorney, Agent, or Firm* — Sughrue Mion, PLLC

(57) ABSTRACT

A multi-region imaging device (1000', 2000) and method (9000'). The multi-region imaging device (1000', 2000) comprises: a picture light projection plate (1100', 2100'), wherein the picture light projection plate (1100', 2100') comprises a first region (1110', 2110') and a second region (1120', 2120') that do not overlap each other, the first region (1110', 2110') and the second region (1120', 2120') emit picture light for imaging; and an optical path compensation section (1200', 2200'), wherein the optical path compensation section (1200', 2200') is arranged on a propagation path of the picture light emitted by the second region (1120', 2120'), and the picture light emitted by the second region (1120', 2120') is transmitted by the optical path compensation section (1200', 2200') and optical path compensation is carried out thereon.

19 Claims, 12 Drawing Sheets

(51) Int. Cl.
    *G03B 21/28*     (2006.01)
    *H04N 9/31*     (2006.01)

(56) References Cited

U.S. PATENT DOCUMENTS

2018/0314063 A1*  11/2018  Yatsu ................ G02B 27/0101
2019/0187475 A1   6/2019  Omanovic et al.

FOREIGN PATENT DOCUMENTS

| | | |
|---|---|---|
| CN | 207557584 U | 6/2018 |
| CN | 109100866 A | 12/2018 |
| CN | 109891300 A | 6/2019 |
| CN | 109932819 A | 6/2019 |
| CN | 209433127 U | 9/2019 |
| CN | 110764339 A | 2/2020 |

OTHER PUBLICATIONS

Chinese Office Action for corresponding 201911375388.2, dated Aug. 17, 2020.
International Search Report for PCT/CN2020/086083, dated Jul. 21, 2020.

* cited by examiner

MULTI-REGION IMAGING DEVICE AND METHOD

CROSS-REFERENCE TO RELATED APPLICATIONS

This application is a continuation of International Application No. PCT/CN2020/086083, filed on Apr. 22, 2020, which claims the priorities and benefits of Chinese Patent Application No. 201910958039.7 filed with China National Intellectual Property Administration (CNIPA) on Oct. 10, 2019 and Chinese Patent Application No. 201911375388.2 filed with China National Intellectual Property Administration on Dec. 27, 2019. All of the aforementioned applications are hereby incorporated by reference in their entireties.

TECHNICAL FIELD

Embodiments of the present disclosure relate to the field of image data processing and generation, and more particularly, to a multi-region imaging device and method.

BACKGROUND

As one of common Picture Generation Units (PGU), projection device is widely used in a variety of scenarios. Common projection device generally uses a Digital Micromirror Device (DMD) as the core unit of the PGU. A light signal emitted by an image light projection plate including an DMD chip is subjected to light processing by an optical system and then projected onto a screen to display an image.

Projection device is also widely used in vehicles to realize Head-Up Display (HUD). At present, vehicle-mounted HUD includes various types, such as W-HUD, C-HUD, and AR-HUD.

AR-HUD integrates augmented reality technology and HUD technology well, and can help drivers analyze the surrounding driving environment without affecting the driver's perception of the real driving environment. In an AR-HUD scenario, AR images are often approximatively "integrated" with objects in the real driving environment. This requires AR-HUD to have a larger field of view and a longer imaging distance.

However, even in the AR-HUD scenario, the driver still needs to obtain some indication information related to the vehicle itself, such as speed, gear position and interior temperature. These indications often need to be imaged at a relatively close distance for easy viewing.

An existing method to realize the dual imaging distance HUD is to use two sets of PGUs. For example, a set of Digital Light Processing (DLP) PGU is used to achieve AR imaging, and then a set of Thin Film Transistor PGU is used to achieve indication information imaging. For another example, two sets of TFT-PGU (or two sets of DLP-PGU) are used to realize AR imaging and indication information imaging respectively. However, in this implementation, two or more sets of PGU occupy a larger volume and the cost is high.

Moreover, in addition to the above-mentioned vehicle-mounted HUD, there are also projection display requirements for co-imaging with multiple imaging distances in many other fields.

SUMMARY

The present disclosure provides a multi-region imaging device, where the multi-region imaging device includes: an image light projection plate, where the image light projection plate includes a first region and a second region, and the first region and the second region do not overlap each other and emit image lights for imaging; an optical path compensation portion, where the optical path compensation portion is disposed on a propagation path of the image light emitted by the second region, and the image light emitted by the second region is transmitted through the optical path compensation portion and is compensated for an optical path; and an imaging lens group, where the imaging lens group images the image light emitted by the first region to transmit a first imaging light, and images the image light transmitted by the optical path compensation portion to transmit a second imaging light, and the first imaging light and the second imaging light have different imaging planes.

According to embodiments of the present disclosure, the multi-region imaging device further includes a prism, the prism is disposed between the image light projection plate and the imaging lens group, and the image lights emitted from the first region and the second region are deflected by the prism and then exit.

According to embodiments of the present disclosure, the optical path compensation portion is attached to a light incident surface or a light exit surface of the prism.

According to embodiments of the present disclosure, the optical path compensation portion is disposed between a light incident surface of the prism and the image light projection plate, and is spaced apart from the prism and the image light projection plate.

According to embodiments of the present disclosure, the optical path compensation portion is disposed between a light exit surface of the prism and the imaging lens group, and is spaced apart from the prism and the imaging lens group.

According to embodiments of the present disclosure, the optical path compensation portion is disposed between the image light projection plate and the imaging lens group.

According to embodiments of the present disclosure, the image light projection plate further includes at least one image light region different from the first region and the second region, the at least one image light region emits an image light for imaging; and the imaging lens group images the image light emitted by the at least one image light region to transmit a third imaging light.

According to embodiments of the present disclosure, the optical path compensation portion is integrally formed with a light incident surface or a light exit surface of the prism.

According to embodiments of the present disclosure, the optical path compensation portion is attached to the image light projection plate.

According to embodiments of the present disclosure, the image light projection plate includes a DMD chip, and the DMD chip includes effective pixel regions corresponding to the first region and the second region.

According to embodiments of the present disclosure, the effective pixel region corresponding to the first region emits an image light for synthesizing an AR image, and the effective pixel region corresponding to the second region emits an image light for generating a status indication image.

According to embodiments of the present disclosure, the effective pixel region corresponding to the first region is larger than the effective pixel region corresponding to the second region.

According to embodiments of the present disclosure, the DMD chip includes a disabled non-effective pixel region, and the non-effective pixel region separates the effective pixel region corresponding to the first region and the effective pixel region corresponding to the second region.

According to embodiments of the present disclosure, the multi-region imaging device further includes a pixel controller, and the pixel controller realize the effective pixel regions and the non-effective pixel region of the DMD chip by enabling or disabling pixels of the DMD chip.

According to embodiments of the present disclosure, the optical path compensation portion includes a flat glass, a compensation lens or an optical lens group.

According to embodiments of the present disclosure, the multi-region imaging device further includes a freeform mirror group, the freeform mirror group including a plurality of mirrors with a freeform surface, the freeform surface is designed based on a shape of a windshield glass of a vehicle on which the multi-region imaging device is installed, so as to reflect images formed on a first imaging plane and a second imaging plane onto the windshield glass.

The present disclosure provides a multi-region imaging method, where the multi-region imaging method includes: respectively emitting image lights for imaging with a first region and a second region of an image light projection plate, where the first region and the second region do not overlap each other; compensating an optical path of the image light emitted from the second region with an optical path compensation portion disposed on a propagation path of the image light emitted from the second region; and imaging an image light emitted from the first region with an imaging lens group to transmit a first imaging light, and imaging an image light transmitted through the optical path compensation portion to transmit a second imaging light, where the first imaging light and the second imaging light have different imaging planes.

According to embodiments of the present disclosure, the method further includes: deflecting the image lights emitted by the first region and the second region with a prism disposed between the image light projecting board and the imaging lens group.

According to embodiments of the present disclosure, emitting an image light for synthesizing an AR image with an effective pixel region corresponding to the first region; and emitting an image light for generating a status indication image with an effective pixel region corresponding to the second region.

According to embodiments of the present disclosure, the respectively emitting image lights for imaging with a first region and a second region of an image light projection plate, where the first region and the second region do not overlap each other, includes: respectively emitting, by enabling pixels in different regions of a DMD chip of the image light projection board, the image lights for imaging with the first region and the second region of the image light projection plate, where the first region and the second region do not overlap each other.

According to embodiments of the present disclosure, the multi-region imaging method further includes: reflecting images formed on a first imaging plane and a second imaging plane onto a windshield glass with a freeform mirror group designed based on a shape of the windshield glass of a vehicle.

According to an implementation proposed in the present disclosure, the image light projection plate is used in a partitioned manner, and the optical path compensation portion compensates the optical path of the image light in one of the regions. Therefore, multi-region imaging with different imaging distances can be realized by one set of imaging device, thereby saving space and reducing cost.

An aspect of the present disclosure provides a multi-region projection device, where the multi-region imaging device includes: an image light projection plate, where the image light projection plate includes a first projection region and a second projection region, and the first projection region and the second projection region emit image lights for imaging; an optical path compensation portion, where the optical path compensation portion is disposed on a propagation path of the image lights, the optical path compensation portion includes a first compensation region and a second compensation region with different optical path compensation amounts, and the first compensation region and the second compensation region correspond to the first projection region and the second projection region, respectively; and an imaging lens group, where the imaging lens group images the image light transmitted through the first compensation region to transmit a first imaging light, and images the image light transmitted through the second compensation region to transmit a second imaging light.

According to embodiments of the present disclosure, an optimal imaging plane of the first imaging light is at a first distance from the imaging lens group, an optimal imaging plane of the second imaging light is at a second distance from the imaging lens group, and an imaging depth of the imaging lens group is greater than an absolute value of a difference between the first distance and the second distance.

According to embodiments of the present disclosure, the multi-region projection device further includes a prism, the prism is disposed between the image light projection plate and the imaging lens group, and the image lights emitted from the first projection region and the second projection region are deflected by the prism and then exit.

According to embodiments of the present disclosure, the optical path compensation portion further includes at least one additional compensation region.

According to embodiments of the present disclosure, the optical path compensation portion is attached to a light incident surface or a light exit surface of the prism.

According to embodiments of the present disclosure, the optical path compensation portion is disposed between a light incident surface of the prism and the image light projection plate, and is spaced apart from the prism and the image light projection plate.

According to embodiments of the present disclosure, the optical path compensation portion is disposed between a light exit surface of the prism and the imaging lens group and is spaced apart from the prism and the imaging lens group.

According to embodiments of the present disclosure, the optical path compensation portion is integrally formed with a light incident surface or a light exit surface of the prism.

According to embodiments of the present disclosure, the optical path compensation portion is attached to the image light projection plate.

According to embodiments of the present disclosure, the image light projection plate includes a DMD chip, and the DMD chip includes a first effective pixel corresponding to the first projection region and a second effective pixel region corresponding to the second projection region.

According to embodiments of the present disclosure, the first effective pixel region emits an image light for synthesizing an AR image, and the second effective pixel region emits an image light for generating a status indication image.

According to embodiments of the present disclosure, the first effective pixel region and the second effective pixel region jointly emit image lights for generating a full-frame image.

According to embodiments of the present disclosure, the first effective pixel region is larger than the second effective pixel region.

According to embodiments of the present disclosure, the multi-region projection device further includes a pixel controller, the pixel controller controls the first effective pixel region and the second effective pixel region of the DMD chip to emit the image lights by enabling and disabling pixels of the DMD chip.

According to embodiments of the present disclosure, the multi-region projection device further includes a first light diffusing element disposed at the first distance and a second light diffusing element disposed at the second distance, where a first microstructure unit for diffusing the first imaging light is provided on the first light diffusing element, and a second microstructure unit for diffusing the second imaging light is provided on the second light diffusing element.

According to embodiments of the present disclosure, the multi-region projection device further includes a plurality of mirrors, the mirrors are used to reflect the first imaging light and the second imaging light to an imaging position.

Another aspect of the present disclosure provides a multi-region projection device, where the multi-region projection device includes: an image light projection plate, where the image light projection plate includes a first projection region and a second projection region, and the first projection region and the second projection region emit image lights for imaging; an optical path compensation portion, where the optical path compensation portion is disposed on a propagation path of the image light emitted by the second projection region, and the image light emitted by the second projection region transmits through the optical path compensation portion and is compensated for an optical path; and an imaging lens group, where the imaging lens group images the image light projected by the first projection region to transmit a first imaging light, and images the image light transmitted through the second compensation region to transmit a second imaging light, where an optimal imaging plane of the first imaging light is at a first distance from the imaging lens group, an optimal imaging plane of the second imaging light is at a second distance from the imaging lens group, and an imaging depth of the imaging lens group is greater than a difference between the first distance and the second distance.

Another aspect of the present disclosure provides a multi-region projection method, where the multi-region projection method includes: respectively emitting image lights for imaging with a first projection region and a second projection region of an image light projection plate; compensating optical paths of the image lights emitted from the first projection region and the second projection region with an optical path compensation portion disposed on propagation paths of the image lights, where the optical path compensation portion has a first compensation region and a second compensation region with different optical path compensation amounts, and the first compensation region and the second compensation region correspond to the first projection region and the second projection region, respectively; and imaging the image light transmitted through the first compensation region with an imaging lens group to transmit a first imaging light, and imaging the image light transmitted through the second compensation region with the imaging lens group to transmit a second imaging light, where the first imaging light and the second imaging light have different optimal imaging planes.

According to embodiments of the present disclosure, the optimal imaging plane of the first imaging light is at a first distance from the imaging lens group, the optimal imaging plane of the second imaging light is at a second distance from the imaging lens group, and an imaging depth of the imaging lens group is greater than an absolute value of a difference between the first distance and the second distance.

According to embodiments of the present disclosure, the method further includes: deflecting the image lights emitted by the first projection region and the second projection region with a prism disposed between the image light projecting board and the imaging lens group.

According to embodiments of the present disclosure, the imaging method further includes: emitting an image light for synthesizing an AR image with a first effective pixel region corresponding to the first projection region; and emitting an image light for generating a status indication image with a second effective pixel region corresponding to the second projection region.

According to embodiments of the present disclosure, the respectively emitting image lights for imaging with a first projection region and a second projection region of an image light projection plate, includes: controlling, by enabling pixels in a first effective pixel region and a second effective pixel region of a DMD chip of the image light projection plate, the first projection region and the second projection region of the image light projection plate to respectively emit the images light for imaging.

According to embodiments of the present disclosure, the multi-region projection method further includes: reflecting the first imaging light and the second imaging light to an imaging position with a plurality of mirrors.

According to the multi-region projection device and the multi-region projection method provided by the present disclosure, at least one of the following beneficial effects can be achieved:

Utilizing one set of picture generation unit (PGU) to display different subframe projection images at different projection distances, thereby saving cost and PGU installation space; and Utilizing all pixels of the PGU to display a clear full-frame projection image at an appropriate position, thereby achieving high imaging resolution, large frame and multi-information integrated imaging.

BRIEF DESCRIPTION OF THE DRAWINGS

By reading detailed description of non-limiting embodiments with reference to the following accompanying drawings, other features, objectives and advantages of the present disclosure will be more apparent.

DETAILED DESCRIPTION

Figure 1:
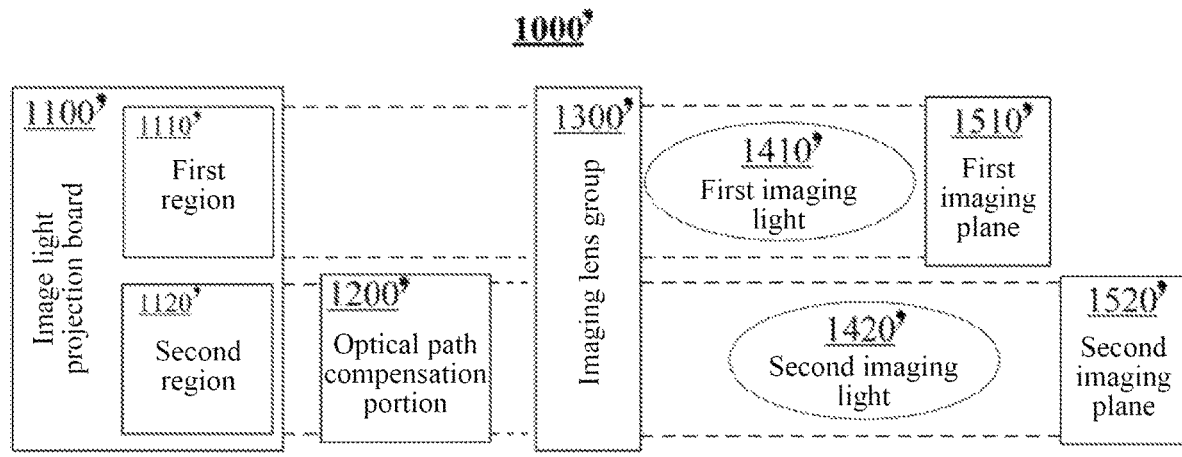
FIG. 1 is a schematic block diagram of a multi-region imaging device according to an embodiment of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first region discussed below may also be referred to as the second region without departing from the teachings of the present disclosure, and vice versa.

In the accompanying drawings, the thicknesses, sizes and shapes of the parts have been slightly adjusted for the convenience of explanation. The accompanying drawings are merely illustrative and not strictly drawn to scale. As used herein, the terms "approximately", "about" and similar terms are used as terms of approximation, not of degree, and are intended to describe inherent bias in measured values or calculated values that would be recognized by those of ordinary skill in the art.

It should be further understood that the terms "comprising", "including", "having", "containing" and/or "contain" in the specification are open-ended expressions rather than closed expression, and specify the presence of stated features, elements and/or components, but do not exclude the presence of one or more other features, elements, components and/or combinations thereof. In addition, expressions, such as "at least one of", when preceding a list of features, modify the entire list of features rather than an individual element in the list. Further, the use of "may", when describing embodiments of the present disclosure, refers to "one or more embodiments of the present disclosure". Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. In addition, unless clearly defined or contradicted by the context, the specific steps included in the methods described in the present disclosure are not necessarily limited to the described order, but may be performed in any order or in parallel. The present disclosure will be described below in detail with reference to the accompanying drawings and in combination with the embodiments.

FIG. 1 is a schematic block diagram of a multi-region imaging device according to an embodiment of the present disclosure.

A multi-region imaging device 1000' includes an image light projection plate 1100', an optical path compensation portion 1200', and an imaging lens group 1300'.

The image light projection plate 1100' may include a light source and an image light processing chip (e.g., a DMD chip). The image light projection plate 1100' may further include a first region 1110' and a second region 1120' that do not overlap each other. The first region 1110' and the second region 1120' respectively emit image lights for imaging. The image light projection plate 1100' may project different image lights based on digital light signals. In one layout of the image light projection plate 1100', the first region 1100' and the second region 1120' may be spaced apart from each other by a distance, through a region that does not emit a light. In another layout of the image light projection plate 1100', the first region 1110' and the second region 1120' may be joined to each other.

The optical path compensation portion 1200' is disposed on the propagation path of the image light emitted by the second region 1120', and the image light emitted from the second region 1120' is transmitted through the optical path compensation portion 1200' and compensated for the optical path by the optical path compensation portion 1200'. The optical path compensation portion 1200' can adjust the optical path by using its material properties, so that the image light transmitted through the optical path compensation portion 1200' and the image light not transmitted through the optical path compensation portion 1200' have different optical paths. Such optical path compensation can cause the image lights emitted from different regions to be finally imaged at different distances.

The imaging lens group 1300' images the image light emitted from the first region 1110' to transmit a first imaging light 1410'. In addition, the imaging lens group 1300' also images the image light transmitted by the optical path compensation portion 1200' to transmit a second imaging light 1420'. The imaging lens group 1300' may include a series of optical lenses, which are designed and arranged according to imaging requirements.

The first imaging light 1410' may present a first information, and the second imaging light 1420' may present a second information. The first imaging light 1410' and the second imaging light 1420' have different imaging planes. For example, an imaging plane 1510' of the first imaging light 1410' and the imaging plane 1520' of the second imaging light 1420' are not on the same plane.

According to the embodiment proposed in the present disclosure, the image light projection plate is used in a partitioned manner, and the optical path compensation portion compensates the optical path of the image light emitted from one of the regions. Therefore, multi-region imaging with different imaging distances can be realized by one set of imaging device, thereby saving space and reducing cost.

Figure 2:
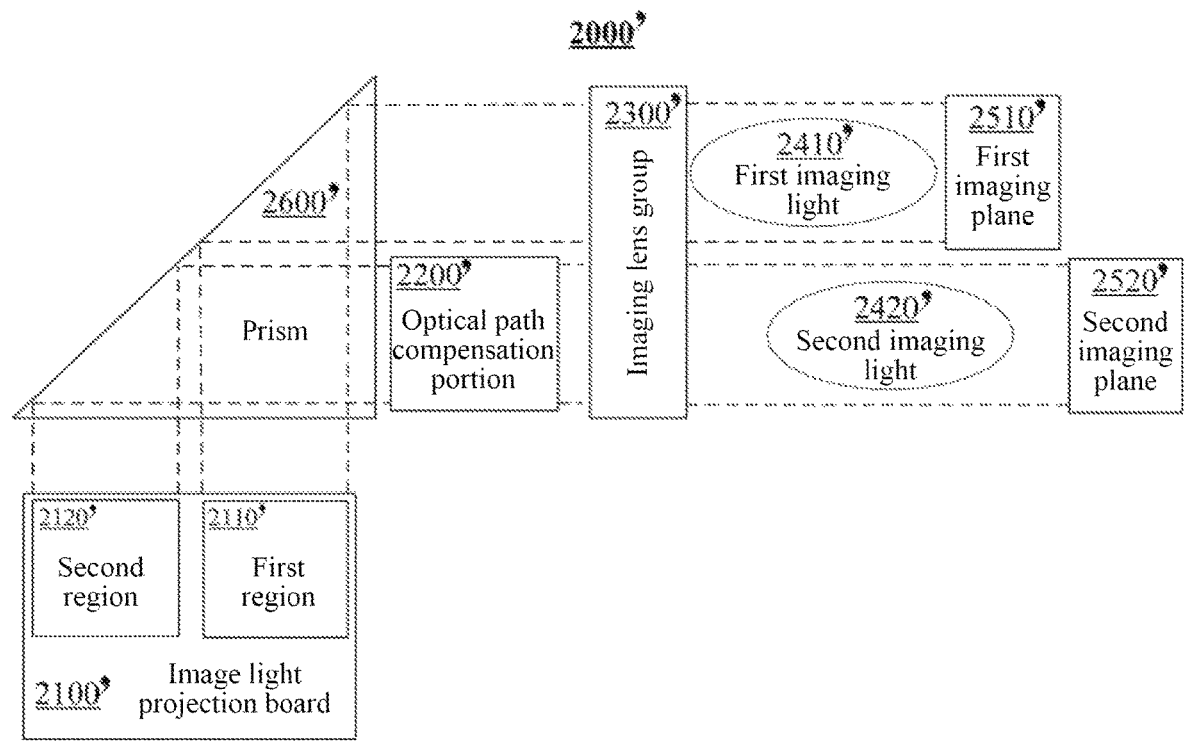
FIG. 2 is a schematic block diagram of a multi-region imaging device according to another embodiment of the present disclosure.

FIG. 2 is a schematic block diagram of a multi-region imaging device according to another embodiment of the present disclosure.

The multi-region imaging device 2000' includes an image light projection plate 2100', an optical path compensation portion 2200', an imaging lens group 2300', and a prism 2600'.

The first region 2110' and the second region 2120' of the image light projection plate 2100' do not overlap each other. The first region 2110' and the second region 2120' respectively emit image lights for imaging. The optical path compensation portion 2200' is disposed on the propagation path of the image light emitted from the second region 2120', and the image light emitted from the second region 2120' is transmitted through the optical path compensation portion 2200' and compensated for the optical path by the optical path compensation portion 2200'. The optical path compensation portion 2200' can adjust the optical path by using its material properties, so that the image light transmitted through the optical path compensation portion 2200' and the image light not transmitted through the optical path compensation portion 2200' have different optical paths. The imaging lens group 2300' images the image light emitted from the first region 2110' to transmit the first imaging light 2410'. In addition, the imaging lens group 2300' also images the image light transmitted by the optical path compensation portion 2200' to transmit the second imaging light 2420'. The first imaging light 2410' and the second imaging light 2420' have different imaging planes. For example, the imaging plane 2510' of the first imaging light 2410' and the imaging plane 2520' of the second imaging light 2420' are not on the same plane.

Different from the device 1000' shown in FIG. 1, the multi-region projection device 2000' shown in FIG. 2 further includes the prism 2600'. The prism 2600' is disposed between the image light projection plate 2100' and the imaging lens group 2300'. The image light emitted by the first region 2110' and the image light emitted by the second region 2120' are deflected by the prism 2600' and then exit. In addition to deflecting lights, prism 2600' may also be used to split lights. The multi-region projection solution provided in this disclosure is not only applicable to PGU that is not refracted by a prism, but also applicable to PGU that is refracted by a prism.

Figure 3:
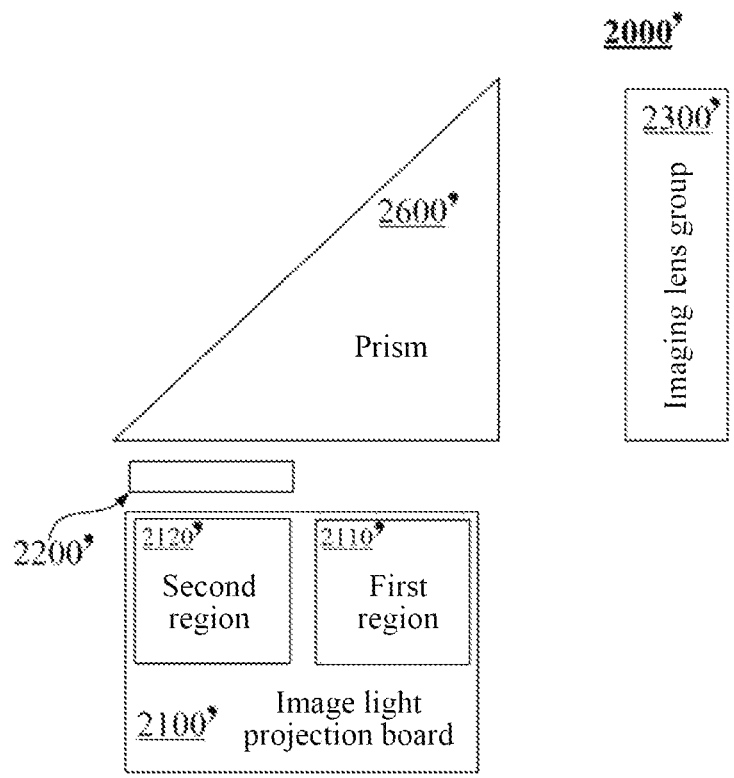
FIG. 3 is a schematic diagram of a layout of an optical path compensation portion according to an embodiment of the present disclosure.

As shown in FIG. 2, the optical path compensation portion 2200' may be disposed between the light exit surface of the prism 2600' and the imaging lens group 2300', and spaced apart from the prism 2600' and the imaging lens group 2300'. Alternatively, as shown in FIG. 3, the optical path compensation portion 2200' may also be disposed between the light incident surface of the prism 2600' and the image light projection plate 2100', and spaced apart from the prism 2600' and the image light projection plate 2100'.

Figure 4:
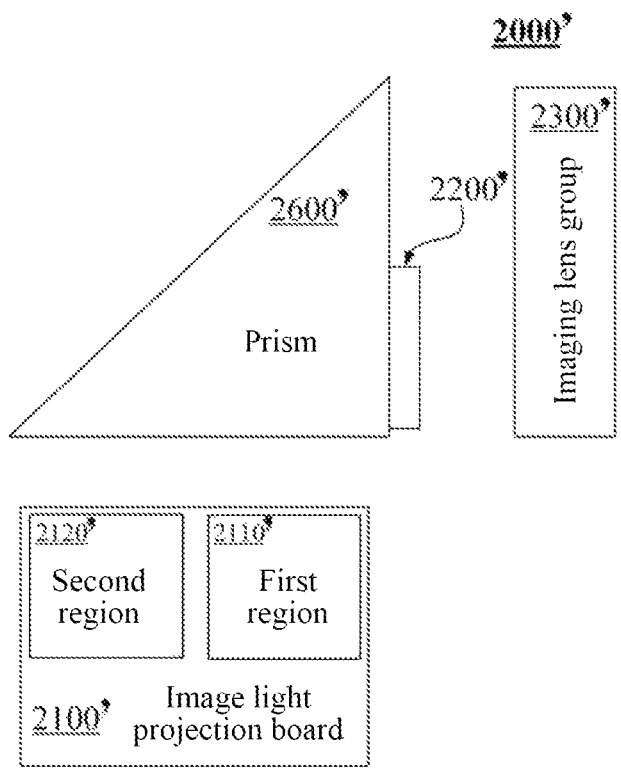
FIG. 4 is a schematic diagram of a layout of an optical path compensation portion according to an embodiment of the present disclosure.

As shown in FIG. 4, the optical path compensation portion 2200' may be attached to the light exit surface of the prism 2600'. In addition, as described above, the optical path compensation portion 2200' should also be disposed on the propagation path of the image light emitted from the second region 2120'. For example, the optical path compensation portion 2200' may cover the cross section of the light beam emitted from the second region 2120'. The optical path compensation portion 2200' may be attached to the light exit surface of the prism 2600' via adhesive.

Figure 5:
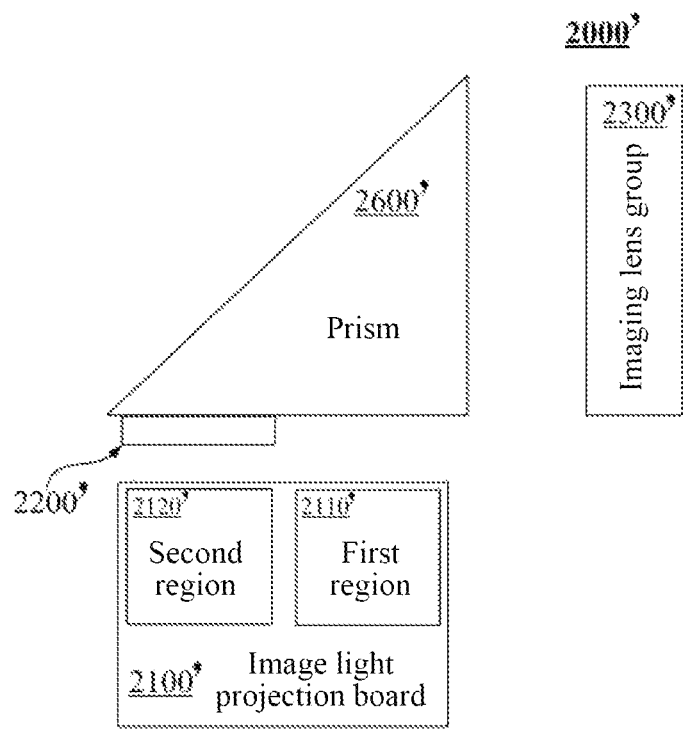
FIG. 5 is a schematic diagram of a layout of an optical path compensation portion according to an embodiment of the present disclosure.

As shown in FIG. 5, the optical path compensation portion 2200' may be attached to the light incident surface of the prism 2600'. In addition, as described above, the optical path compensation portion 2200' should also be disposed on the propagation path of the image light emitted from the second region 2120'. For example, the optical path compensation portion 2200' may cover the cross section of the light beam emitted from the second region 2120'. The optical path compensation portion 2200' may be attached to the light incident surface of the prism 2600' via adhesive.

Figure 6:
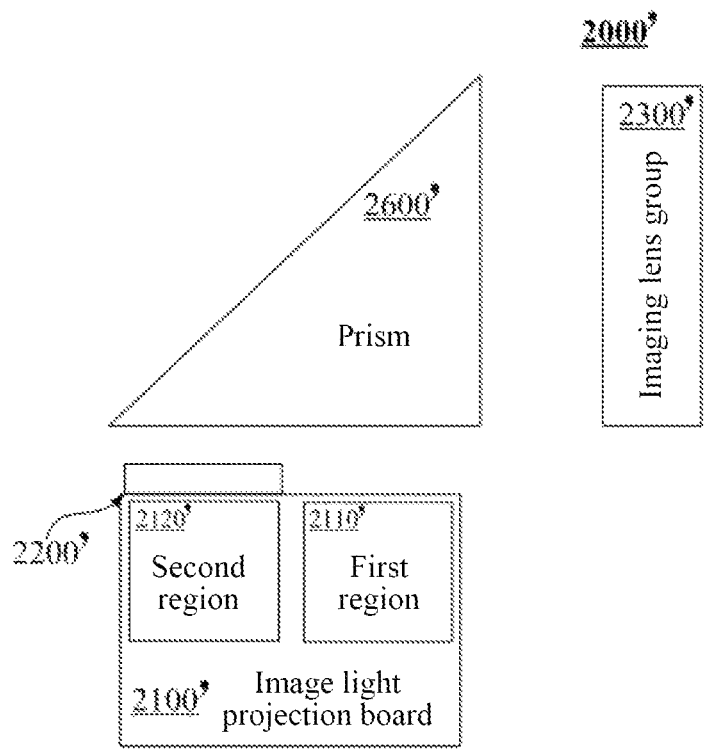
FIG. 6 is a schematic diagram of a layout of an optical path compensation portion according to an embodiment of the present disclosure.

As shown in FIG. 6, the optical path compensation portion 2200' may be attached to the image light projection plate 2100'. In addition, as described above, the optical path compensation portion 2200' should also be disposed on the propagation path of the image light emitted from the second region 2120'. For example, the optical path compensation portion 2200' may cover the cross section of the light beam emitted from the second region 2120'. The optical path compensation portion 2200' may be attached to the image light projection plate 2100' via adhesive.

According to the embodiment of the present disclosure, the optical path compensation portion 2200' may be disposed between the image light projection plate and the imaging lens group.

According to an embodiment of the present disclosure, the image light projection plate further includes at least one image light region different from the first region and the second region, the at least one image light region emits an image light for imaging; the imaging lens group images the image light emitted from the at least one image light region to transmit a third image light.

A third imaging light corresponding to each of the at least one image light region may be imaged on the same imaging plane or different imaging planes. In addition, the third imaging light may have the same imaging plane as the first imaging light, or the same imaging plane as the second imaging light. In addition, the third imaging light may have an imaging plane different from the imaging plane of the first imaging light and the imaging plane of the second imaging light. For example, the optical path of the image light emitted by the at least one image light region may be compensated by an additional optical path compensation portion.

According to embodiments of the present disclosure, the optical path compensation portion 2200' and the light incident surface or the light exit surface of the prism 2600' can be integrally formed. For example, the prism 2600' may be processed into a special-shaped prism such that the thickness of a region through which the propagation path of the image light emitted from the second region 2120' passes is changed, thereby compensating the optical path of the image light.

According to embodiments of the present disclosure, the optical path compensation portion may include any one of a flat glass, a compensation lens and an optical lens group, or a combination of any two of them. For example, the optical path compensation portion may include a piece of flat glass disposed at the light incident surface of the prism and a group of optical path compensation optical lenses disposed at the light exit surface of the prism. The optical path compensation portion can adjust the optical path by using its material properties, so that the image light transmitted through the optical path compensation portion and the image light not transmitted through the optical path compensation portion have different optical paths.

According to an embodiment of the present disclosure, the image light projection plate may include a DMD chip. The DMD chip may include effective pixel regions corresponding to the first region and the second region. The effective pixel region corresponding to the first region may be larger than the effective pixel region corresponding to the second region. Alternatively, the effective pixel region corresponding to the first region may be equal to the effective pixel region corresponding to the second region. Still alternatively, the effective pixel region corresponding to the first region may be smaller than the effective pixel region corresponding to the second region. The image light projection plate may further include protective glass attached to the DMD chip. For example, in a scenario of AR-HUD, the effective pixel region in the DMD chip corresponding to the first region may emit an image light for synthesizing an AR image, and the effective pixel region in the DMD chip corresponding to the second region may emit an image light for generating a status indication image. Since the indication information often does not need to occupy an excessively large display space, the effective pixel region corresponding to the first region may be larger than the effective pixel region corresponding to the second region. The DMD chip may include a disabled non-effective pixel region. The disabled non-effective pixel region separates the effective pixel region corresponding to the first region and the effective pixel region corresponding to the second region.

There is no need to individually design the DMD chip applicable to the present disclosure, and the DMD chip may be implemented based on the hardware structure of the existing DMD chip. Specifically, the multi-region imaging device of each embodiment of the present disclosure may further include a pixel controller for controlling the pixels of the DMD chip. The pixel controller can realize the effective pixel region and the non-effective pixel region of the DMD chip by enabling or disabling the pixels of the DMD chip.

Figure 7:
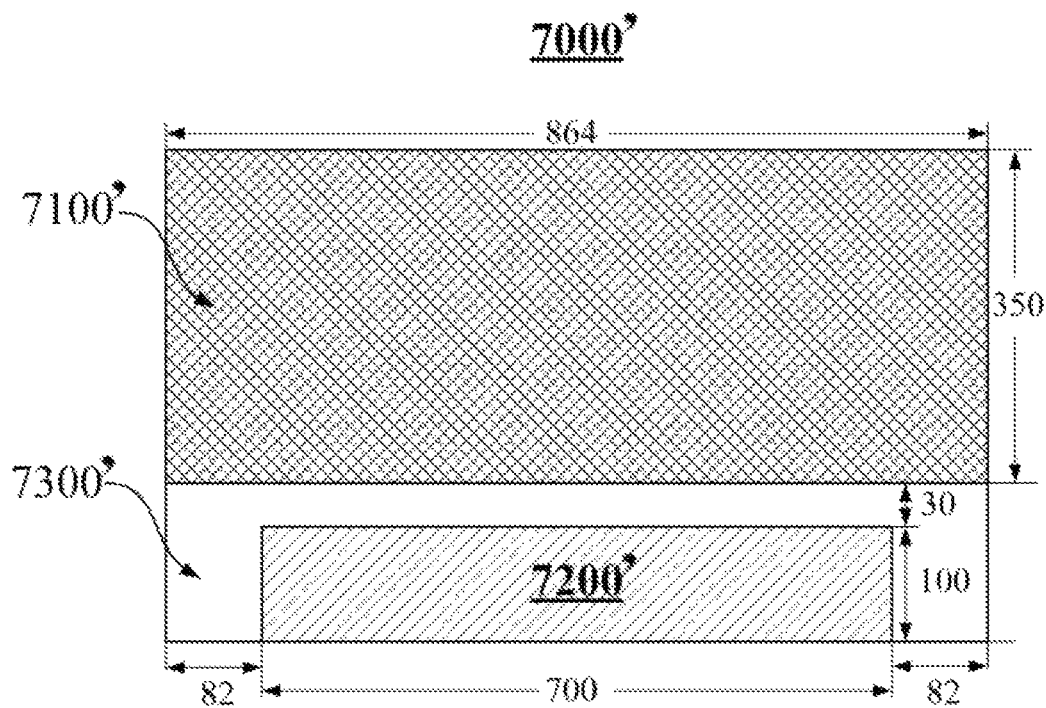
FIG. 7 is a schematic diagram of pixel control of a DMD chip according to an embodiment of the present disclosure.

The above-mentioned pixel control process will be explained below with reference to FIG. 7 taking a 3030 DMD chip of Texas Instruments (TI) as an example. For the convenience of citation, the 3030 DMD chip is hereinafter referred to as the DMD chip 7000'. The DMD chip 7000' has a pixel arrangement of 864×480. According to the requirements of multi-region projection applications such as vehicle-mounted AR-HUD, the DMD chip may be divided into a first effective pixel region 7100' corresponding to the first region and a second effective pixel region 7200' corresponding to the second region. The first effective pixel region 7100' may have a pixel arrangement of 864×350, and the second effective pixel region 7200' may have a pixel arrangement of 700×100. The first effective pixel region 7100' may be controlled to emit an image light for synthesizing an AR image. The second effective pixel region 7200' may be controlled to emit an image light for generating a status indication image. The DMD chip can be pixel controlled through program coding, so that the first effective pixel region 7100' and the second effective pixel region 7200' are separated by a section of non-effective pixel region 7300' that does not an emit light. For example, the non-effective pixel region 7300' may be disabled by encoding control. According to this technical solution, under a condition of not changing the hardware design of the existing DMD chip, software control can be used to realize the sub-regional projection of the image light projection plate, so as to finally realize the multi-region imaging device. Such a design avoids the high cost of a multi-lens/multi-PGU solution.

According to an embodiment of the present disclosure, the multi-region imaging device may further include a freeform mirror group, and the freeform mirror group includes a plurality of mirrors with freeform surfaces. The freeform surface is designed based on the shape of the windshield glass of the vehicle on which the multi-region imaging device is installed, so as to reflect the images formed on the first imaging plane and the second imaging plane on the windshield glass. This solution is illustrated below with reference to FIG. 8 taking the scenario of the vehicle-mounted AR-HUD as an example.

Figure 8:
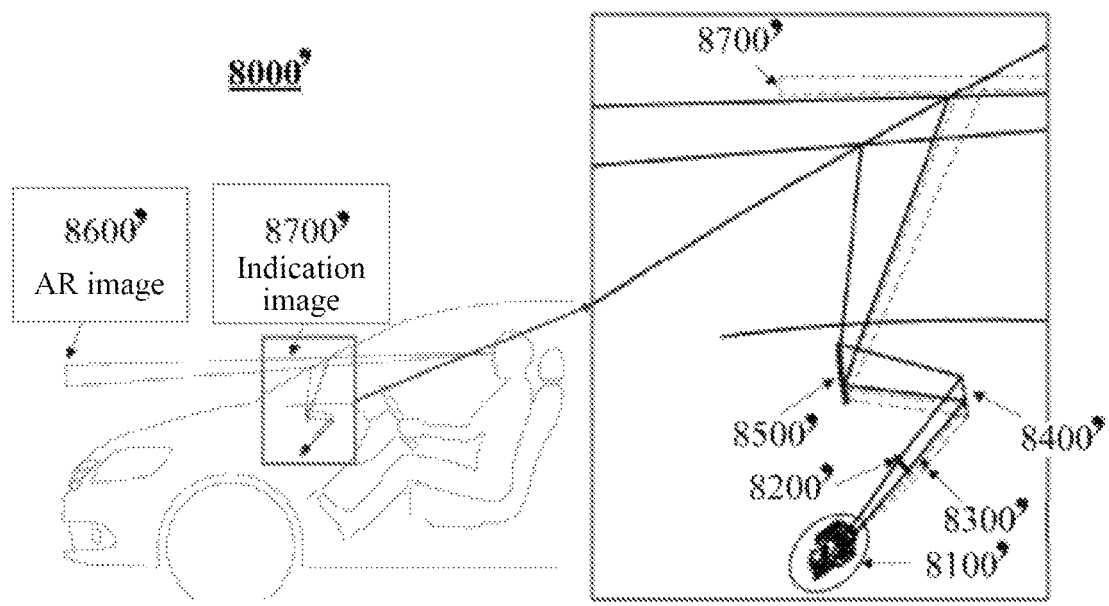
FIG. 8 is a schematic diagram of an AR-HUD projection method according to an embodiment of the present disclosure.

Referring to FIG. 8, the basic structure of a multi-region imaging device 8000' may be substantially the same as the multi-region imaging device 1000' described above with reference to FIG. 1 or the multi-region imaging device 2000' described above with reference to FIG. 2. The image light projection plate, the optical path compensation portion and the imaging lens group of the multi-region imaging device 8000' are collectively described as PGU 8100'. A first imaging light and a second imaging light emitted by the PGU 8100' are respectively imaged on the first imaging plane 8200' and the second imaging plane 8300'. The multi-region imaging device 8000' may further include a freeform mirror group. The freeform mirror group may sequentially include a small freeform mirror 8400' and a large freeform mirror 8500' along the light propagation path. The freeform surfaces of the small freeform mirror 8400' and the large freeform mirror 8500' are designed based on the shape of the windshield glass of the vehicle in which the multi-region imaging device 8000' is installed, so as to eliminate or reduce various aberrations as much as possible. The small freeform mirror 8400' and the large freeform mirror 8500' respectively reflect the image formed by the first imaging plane 8200' and the image formed by the second imaging plane 8300' onto the windshield glass. Due to the different positions and angles of projection and the different imaging points of the projected images, the driver can perceive the two images at different image depths. For example, a driver may perceive an AR image 8600' providing a deep analysis of the driving environment at a farther imaging point, and an indication image 8700' showing vehicle information at a closer imaging point.

Figure 9:
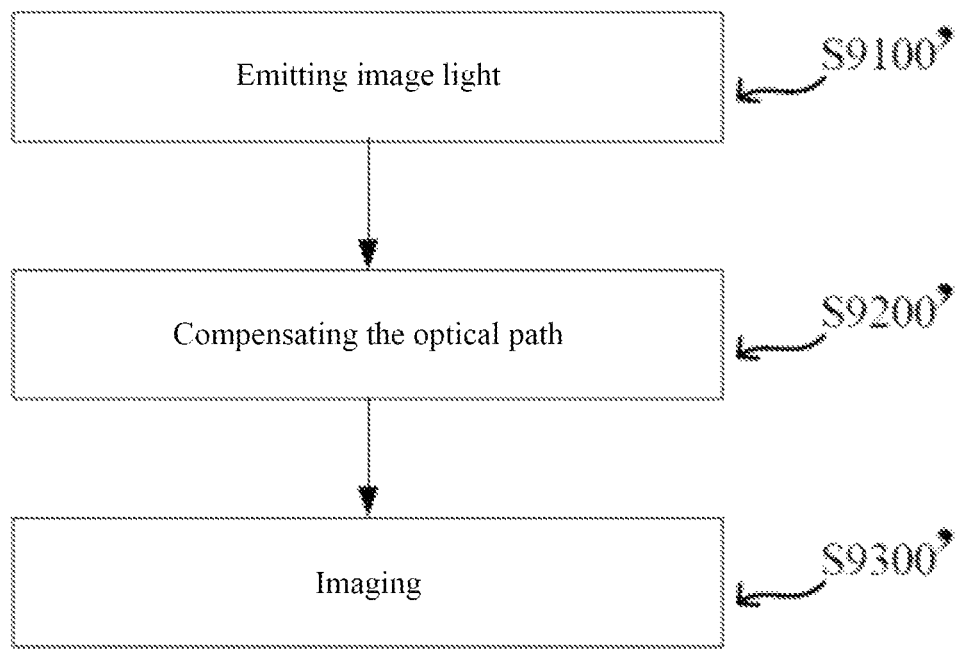
FIG. 9 is a flowchart of a multi-region imaging method according to an embodiment of the present disclosure.

FIG. 9 is a flowchart of a multi-region imaging method according to an embodiment of the present disclosure. A multi-region imaging method 9000' includes: in operation S9100', respectively emitting image lights for imaging with a first region and a second region of an image light projection plate that do not overlap each other; in operation S9200', compensating an optical path of an image light emitted from the second region with an optical path compensation portion disposed on a propagation path of the image light emitted from the second region; and in operation S9300', imaging an image light emitted from the first region with an imaging lens group to transmit a first imaging light, and imaging an image light transmitted through the optical path compensation portion with the imaging lens group to transmit a second imaging light, the first imaging light and the second imaging light having different imaging planes.

According to embodiments of the present disclosure, the method further includes: deflecting images emitted by the first region and the second region with a prism disposed between the image light projecting board and the imaging lens group.

According to embodiments of the present disclosure, the imaging method further includes: emitting an image light for synthesizing an AR image with an effective pixel region corresponding to the first region; and emitting an image light for generating a status indication image with an effective pixel region corresponding to the second region.

According to embodiments of the present disclosure, respectively emitting image lights for imaging from a first region and a second region of the image light projection plate that do not overlap each other includes: by enabling pixels in different regions of the DMD chip of the image light projection plate, respectively emitting the image lights for imaging from the first region and the second region of the image light projection plate that do not overlap each other.

According to the embodiment of the present disclosure, the multi-region imaging method further includes: reflecting the images formed on the first imaging plane and the second imaging plane onto the windshield glass by using a freeform mirror group designed based on the shape of the windshield glass of the vehicle.

Figure 10:
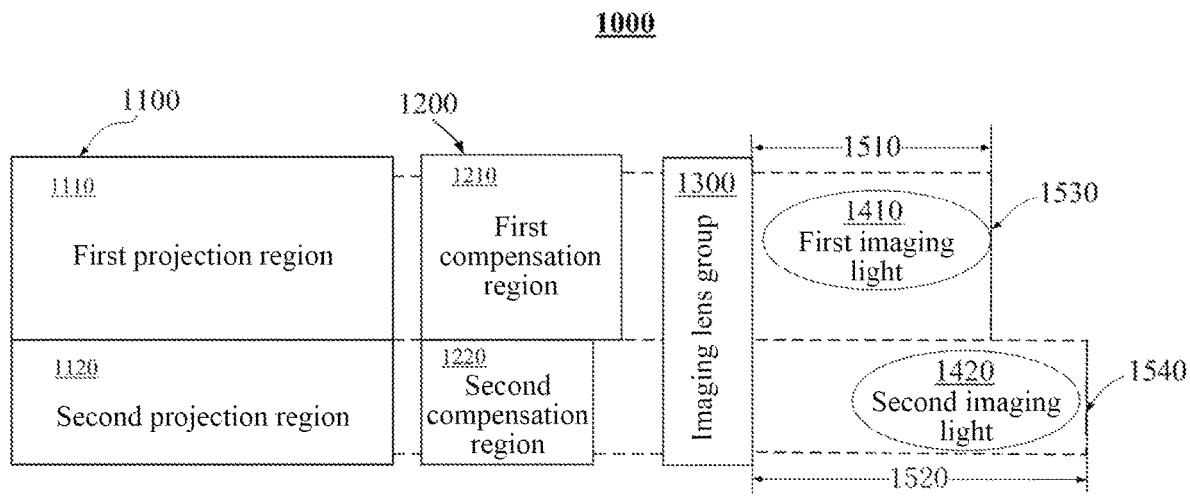
FIG. 10 is a schematic block diagram of a multi-region projection device according to an embodiment of the present disclosure.

FIG. 10 is a schematic block diagram of a multi-region projection device according to embodiments of the present disclosure.

A multi-region projection device 1000 includes an image light projection plate 1100, an optical path compensation portion 1200 and an imaging lens group 1300.

The image light projection plate 1100 may include a first projection region 1110 and a second projection region 1120. The first projection region 1110 and the second projection region 1120 respectively emit image lights for imaging. The image light projection plate 1100 may project different image lights on the first projection region 1110 and the second projection region 1120 based on digital light signals. The first projection region 1110 and the second projection region 1120 may be configured with different sizes according to actual needs. For example, the first projection region 1110 may be larger than the second projection region 1120, and vice versa. In addition, the first projection region 1110 and the second projection region 1120 may alternatively have substantially the same size.

The optical path compensation portion 1200 may include a first compensation region 1210 and a second compensation region 1220, which have different optical path compensation amounts. The optical path compensation portion 1200 is disposed on the propagation path of the image lights emitted by the image light projection plate 1100. The optical path compensation portion 1200 may be a lens or flat glass to compensate the optical paths of the image lights. Different optical path compensation requirements for different image lights can be achieved by selecting compensation materials with different refractive indexes or thicknesses. The image light emitted by the first projection region 1110 of the image light projection plate 1100 and the image light emitted by the second projection region 1120 of the image light projection plate 1100 are respectively transmitted through the first compensation region 1210 and the second compensation region 1220 of the optical path compensation portion 1200, and are compensated for optical paths by the compensation regions of the optical path compensation portion 1200 which have the different compensation amounts. Specifically, the first compensation region 1210 and the second compensation region 1220 may correspond to the first projection region 1110 and the second projection region 1120, respectively. The optical path compensation portion 1200 can adjust the optical paths by using the characteristic that different compensation regions thereof have different thicknesses, so that the image lights transmitted through different compensation regions of the optical path compensation portion 1200 have different optical paths. Such optical path compensation can cause the image lights emitted from different compensation regions to be finally imaged at different distances.

The imaging lens group 1300 images the image light transmitted through the first compensation region 1210 to transmit a first imaging light 1410. The first imaging light 1410 may present the clearest image at a position away from the imaging lens group 1300 by a first distance 1510, and the plane at this position is also referred to as a best imaging plane 1530 of the first imaging light 1410. In addition, the imaging lens group 1300 also images the image light transmitted through the second compensation region 1220 to transmit a second imaging light 1420. The second imaging light 1420 may present the clearest image at a position away from the imaging lens group 1300 by a second distance 1520, and the plane at this position is also referred to as a best imaging plane 1540 of the second imaging light 1420. The imaging lens group 1300 may include a series of optical lenses, which are designed and arranged according to imaging requirements.

According to embodiments proposed in the present disclosure, the image light projection plate is used in a partitioned manner, and the optical path compensation portion compensates the optical paths of the image lights emitted by different projection regions of the image light projection plate by utilizing the characteristic that different compensation regions have different optical path compensation amounts. Therefore, multi-region single-frame imaging with different imaging distances can be realized by one set of projection device, thereby saving space and reducing cost.

Figure 11:
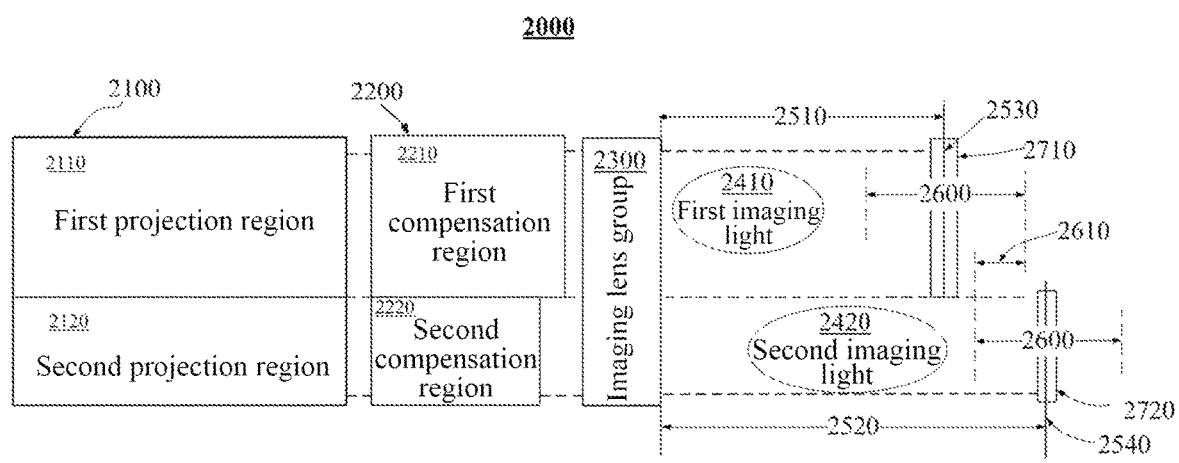
FIG. 11 is a schematic block diagram of a multi-region projection device according to another embodiment of the present disclosure.

FIG. 11 is a schematic block diagram of a multi-region projection device according to another embodiment of the present disclosure.

A multi-region projection device 2000 includes an image light projection plate 2100, an optical path compensation portion 2200 and an imaging lens group 2300.

The image light projection plate 2100 may include a first projection region 2110 and a second projection region 2120. The first projection region 2110 and the second projection region 2120 respectively emit image lights for imaging. The optical path compensation portion 2200 may include a first compensation region 2210 and a second compensation region 2220 which have different optical path compensation amounts. The optical path compensation portion 2200 is disposed on the propagation paths of the image lights emitted by the image light projection plate 2100. The optical path compensation portion 2200 may be a lens or flat glass to compensate the optical paths of the image lights. Different optical path compensation requirements for different image lights can be achieved by selecting compensation materials with different refractive indexes or thicknesses. The image lights emitted by the first projection region 2110 and the second projection region 2120 of the image light projection plate 2100 transmit through the first compensation region 2210 and the second compensation region 2220 of the optical path compensation portion 2200, respectively, and are compensated for different optical paths by the compensation regions of the optical path compensation portion 2200 which have different optical path compensation amounts. Specifically, the first compensation region 2210 and the second compensation region 2220 correspond to the first projection region 2110 and the second projection region 2120, respectively. The optical path compensation portion 2200 can adjust the optical paths by using the characteristic that different compensation regions have different thicknesses, so that the image lights transmitted through the different compensation regions of the optical path compensation portion 2200 have different optical paths. In addition, the imaging lens group 2300 images the image light transmitted through the first compensation region 2210 to transmit a first imaging light 2410. The imaging lens group 2300 also images the image light transmitted through the second compensation region 2220 to transmit a second imaging light 2420.

The first imaging light 2410 may present a clear image within a certain distance from the imaging lens group 2300. Here, an optimal imaging plane 2530 of the first imaging light 2410 is at a first distance 2510 from the imaging lens group 2300. The second imaging light 2420 may present a clear image within a certain distance from the imaging lens group 2300. Here, an optimal imaging plane 2540 of the second imaging light 2420 is at a second distance 2520 from the imaging lens group 2300. The imaging lens group 2300 of the multi-region projection device 2000 of FIG. 11 may have a large imaging depth. For example, an imaging depth 2600 of the imaging lens group 2300 is greater than the difference between the first distance 2510 and the second distance 2520. In this case, the first imaging light 2410 and the second imaging light 2420 may be simultaneously imaged on an imaging plane formed between the first distance 2510 and the second distance 2520 from the imaging lens group 2300.

As shown in FIG. 11, the first imaging light 2410 may present a clear image within a certain range on the left and right of the optimal imaging plane 2530, and the depth of this range along the direction of the optical axis is the imaging depth 2600 of the imaging lens group 2300. Similarly, the second imaging light 2420 may present a clear image within a certain range on the left and right of the optimal imaging plane 2540, and the depth of this range along the direction of the optical axis is also the imaging depth 2600 of the imaging lens group 2300. When the imaging depth 2600 is large, for example, when the imaging depth 2600 is greater than the difference between the first distance 2510 and the second distance 2520, the range in which the first imaging light 2410 can be clearly imaged and the range in which the second imaging light 2420 can be clearly imaged will overlap each other. In an overlapping region 2610, both the first imaging light 2410 and the second imaging light 2420 can be clearly imaged.

By adopting such an imaging lens group 2300 with a large imaging depth, the multi-region projection device 2000 can realize clear full-frame imaging in the above-mentioned overlapping region 2610. In this case, the multi-region projection device 2000 may utilize the pixels of the image light projection plate 2100 to the maximum extent, and realize a large screen and high resolution.

In addition, the multi-region projection device 2000 shown in FIG. 11 may further include a first light diffusing element 2710 and a second light diffusing element 2720. The first light diffusing element 2710 may be located at the optimal imaging plane 2530 that is separated from the imaging lens group 2300 by the first distance 2510. The second light diffusing element 2720 may be located at the optimal imaging plane 2540 that is separated from the imaging lens group 2300 by the second distance 2520.

Figure 12:
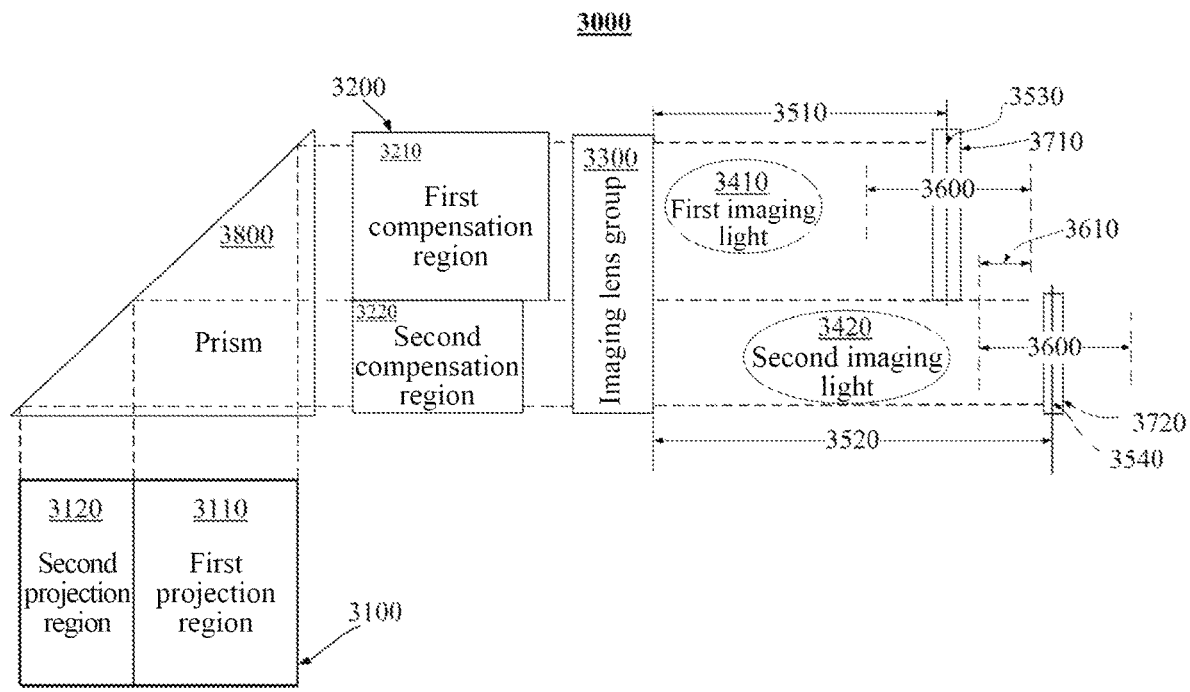
FIG. 12 is a schematic block diagram of a multi-region projection device according to another embodiment of the present disclosure.

FIG. 12 is a schematic block diagram of a multi-region projection device according to another embodiment of the present disclosure.

A multi-region projection device 3000 includes an image light projection plate 3100, an optical path compensation portion 3200, an imaging lens group 3300 and a prism 3800.

The image light projection plate 3100 may include a first projection region 3110 and a second projection region 3120. The first projection region 3110 and the second projection region 3120 respectively emit image lights for imaging. The optical path compensation portion 3200 may include a first compensation region 3210 and a second compensation region 3220 which have different optical path compensation amounts. The optical path compensation portion 3200 is disposed on the propagation paths of the image lights emitted by the image light projection plate 3100. The image lights emitted by the first projection region 3110 and the second projection region 3120 of the image light projection plate 3100 transmit through the first compensation region 3210 and the second compensation region 3220 of the optical path compensation portion 3200, respectively, and are compensated for different optical paths by the compensation regions of the optical path compensation portion 3200 which have different optical path compensation amounts. Specifically, the first compensation region 3210 and the second compensation region 3220 correspond to the first projection region 3110 and the second projection region 3120, respectively. The optical path compensation portion 3200 can adjust the optical paths by using the characteristic that different compensation regions have different thicknesses, so that the image lights transmitted through the different compensation regions of the optical path compensation portion 3200 have different optical paths. In addition, the imaging lens group 3300 images the image light transmitted through the first compensation region 3210 to transmit a first imaging light 3410. The imaging lens group 3300 also images the image light transmitted through the second compensation region 3220 to transmit a second imaging light 3420.

The first imaging light 3410 may present a clear image within a certain distance from the imaging lens group 3300. Here, an optimal imaging plane 3530 of the first imaging light 3410 is at a first distance 3510 from the imaging lens group 3300. The second imaging light 3420 may present a clear image within a certain distance from the imaging lens group 3300. Here, an optimal imaging plane 3540 of the second imaging light 3420 is at a second distance 3520 from the imaging lens group 3300. The imaging lens group 3300 of the multi-region projection device 3000 of FIG. 12 may have a large imaging depth. For example, an imaging depth 3600 of the imaging lens group 3300 is greater than the difference between the first distance 3510 and the second distance 3520. In this case, the first imaging light 3410 and the second imaging light 3420 may be simultaneously imaged on an imaging plane formed between the first distance 3510 and the second distance 3520 from the imaging lens group 3300. As shown in FIG. 12, the first imaging light 3410 may present a clear image within a certain range on the left and right of the optimal imaging plane 3530, and the depth of this range along the direction of the optical axis is the imaging depth 3600 of the imaging lens group 3300. Similarly, the second imaging light 3420 may present a clear image within a certain range on the left and right of the optimal imaging plane 3540, and the depth of this range along the direction of the optical axis is also the imaging depth 3600 of the imaging lens group 3300. When the imaging depth 3600 is large, for example, when the imaging depth 3600 is greater than the difference between the first distance 3510 and the second distance 3520, the range in which the first imaging light 3410 can be clearly imaged and the range in which the second imaging light 3420 can be clearly imaged will overlap each other. In an overlapping region 3610, both the first imaging light 3410 and the second imaging light 3420 can be clearly imaged. By adopting such an imaging lens group 3300 with a large imaging depth, the multi-region projection device 3000 can realize full-frame imaging in the overlapping region 3610. In this case, the multi-region projection device 3000 may utilize the pixels of the image light projection plate 3100 to the maximum extent, and realize a large screen and high resolution.

In addition, the multi-region projection device 3000 shown in FIG. 12 may further include a first light diffusing element 3710 and a second light diffusing element 3720. The first light diffusing element 3710 may be located at the optimal imaging plane 3530 that is separated from the imaging lens group 3300 by the first distance 3510. The second light diffusing element 3720 may be located at the optimal imaging plane 3540 that is separated from the imaging lens group 3300 by the second distance 3520.

Different from the multi-region projection device 2000 shown in FIG. 11, the multi-region projection device 3000 shown in FIG. 12 further includes a prism 3800. The prism 3800 is disposed between the image light projection plate 3100 and the imaging lens group 3300. The image light emitted by the first projection region 3110 and the second projection region 3120 is deflected by the prism 3800 and then exits. The multi-region projection solution provided in the present disclosure is not only applicable to direct-type PGU, but also to prism-type PGU.

Figure 13:
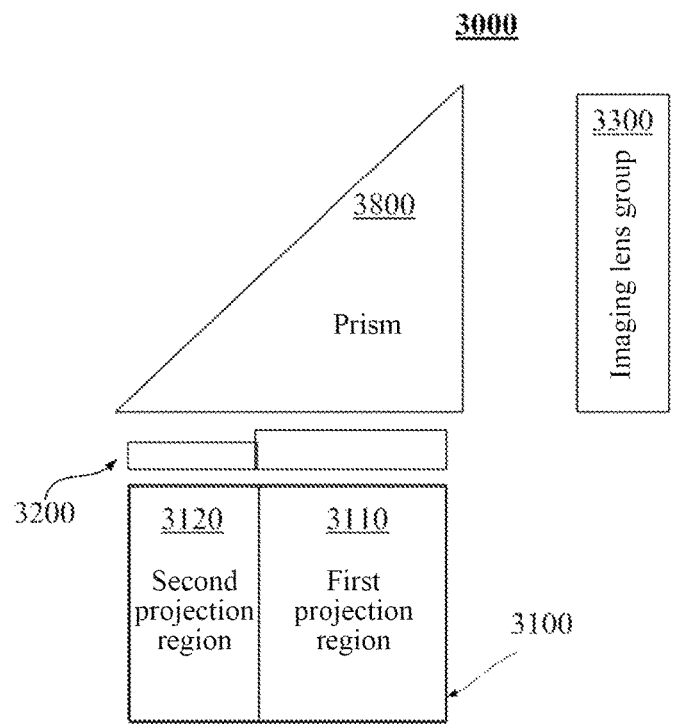
FIG. 13 is a schematic diagram of a layout of an optical path compensation portion according to an embodiment of the present disclosure.

As shown in FIG. 12, the optical path compensation portion 3200 may be disposed between the light exit surface of the prism 3800 and the imaging lens group 3300, and spaced apart from the prism 3800 and the imaging lens group 3300. Alternatively, as shown in FIG. 13, the optical path compensation portion 3200 may also be disposed between the light incident surface of the prism 3800 and the image light projection plate 3100, and spaced apart from the prism 3800 and the image light projection plate 3100.

Figure 14:
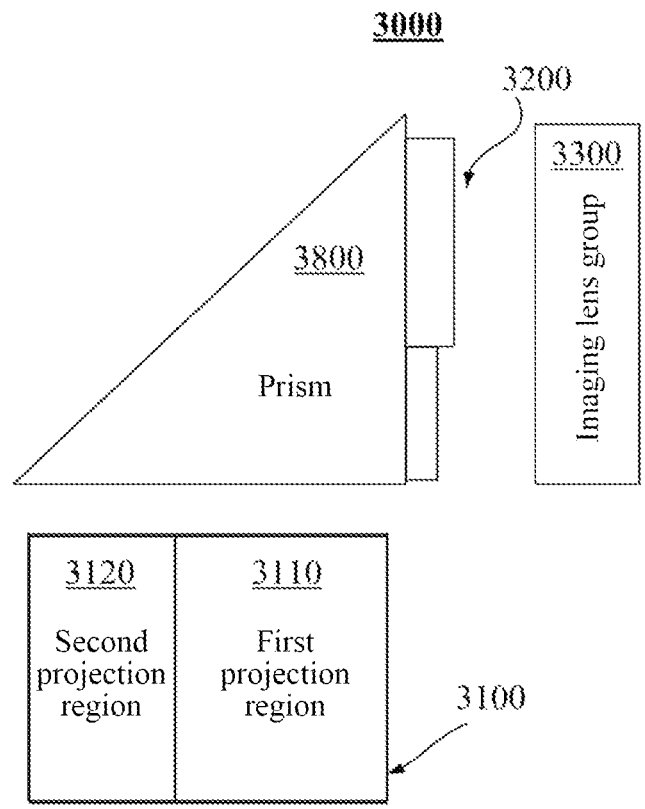
FIG. 14 is a schematic diagram of a layout of an optical path compensation portion according to an embodiment of the present disclosure.

As shown in FIG. 14, the optical path compensation portion 3200 may be attached to the light exit surface of the prism 3800. In addition, as described above, the optical path compensation portion 3200 should also be disposed on the propagation paths of the image lights emitted by the image light projection plate 3100. For example, the optical path compensation portion 3200 may cover the cross section of the light beam emitted by the image light projection plate 3100. The optical path compensation portion 3200 may be attached to the light exit surface of the prism 3800 via adhesive.

Figure 15:
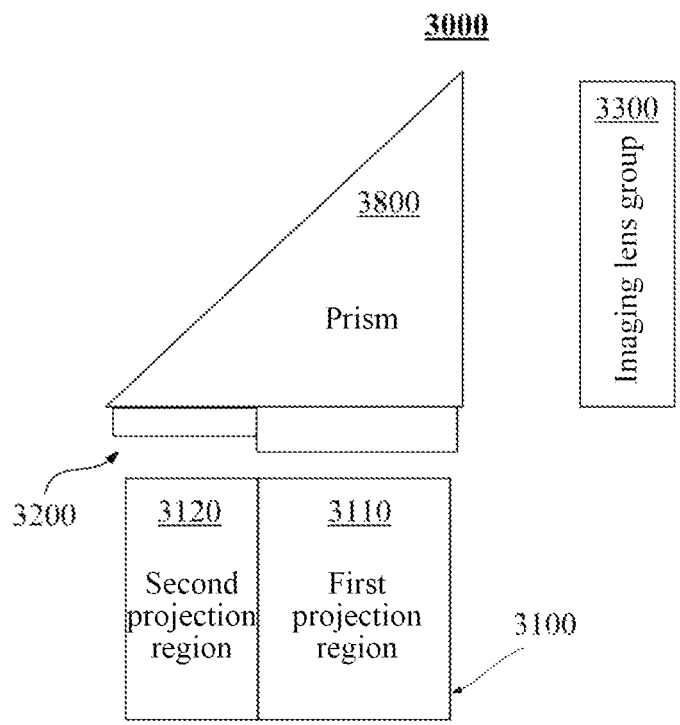
FIG. 15 is a schematic diagram of a layout of an optical path compensation portion according to an embodiment of the present disclosure.

As shown in FIG. 15, the optical path compensation portion 3200 may be attached to the light incident surface of the prism 3800. In addition, as described above, the optical path compensation portion 3200 should also be disposed on the propagation paths of the image lights emitted by the image light projection plate 3100. For example, the optical path compensation portion 3200 may cover the cross section of the light beam emitted by the image light projection plate 3100. The optical path compensation portion 3200 may be attached to the light incident surface of the prism 3800 via adhesive.

Figure 16:
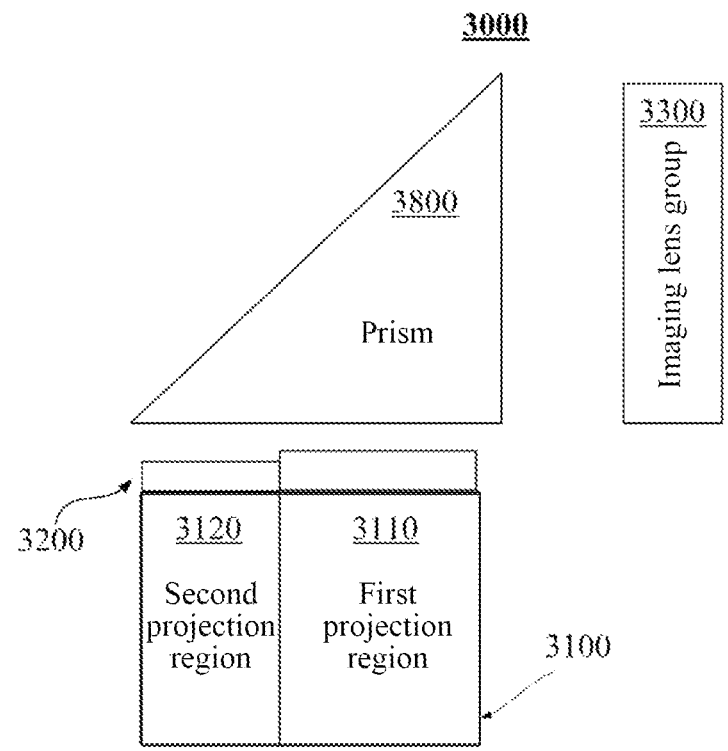
FIG. 16 is a schematic diagram of a layout of an optical path compensation portion according to an embodiment of the present disclosure.

As shown in FIG. 16, the optical path compensation portion 3200 may be attached to the image light projection plate 3100. In addition, as described above, the optical path compensation portion 3200 should also be disposed on the propagation paths of the image lights emitted by the image light projection plate 3100. For example, the optical path compensation portion 3200 may cover the cross section of the light beam emitted by the image light projection plate 3100. The optical path compensation portion 3200 may be attached to the image light projection plate 3100 via adhesive.

According to embodiments of the present disclosure, the image light projection plate 3100 may include a DMD chip. The DMD chip may include a first effective pixel region and a second effective pixel region corresponding to the first projection region 3110 and the second projection region 3120, respectively. For example, in a scenario of AR-HUD, the first effective pixel region in the DMD chip may emit an image light for synthesizing an AR image, and the second effective pixel region in the DMD chip may emit an image light for generating a status indication image. Since the indication information usually does not need to occupy an excessively large display space, the first effective pixel region of the DMD chip applied in this scenario may be larger than the second effective pixel region.

In addition, the first effective pixel region and the second effective pixel region in the DMD chip may jointly emit image lights for generating a full-frame image, thus a full-frame image with a larger image plane can be achieved in a condition that single-frame images such as AR image and status indication image do not need to be displayed separately. For example, the image lights emitted by the first effective pixel region and the second effective pixel region in the DMD chip may be continuous on the imaging plane, so as to display the same frame of image together.

According to embodiments of the present disclosure, an optimal imaging plane of the image lights of the full-frame image may be located between the optimal imaging planes of the image lights after compensation of the corresponding compensation regions. In order to obtain a clear full-frame image, the imaging depth of the imaging lens group may be greater than the distance between the above-mentioned optimal imaging planes. For example, the imaging depth of the imaging lens group may be greater than the distance between the optimal imaging plane of the AR image and the optimal imaging plane of the status indication image. In this case, all effective pixel regions of the DMD chip may be controlled to cooperate to generate image lights corresponding to the full-frame image. Such image lights can be clearly imaged between the optimal imaging plane of the AR image and the optimal imaging plane of the status indication image.

There is no need to individually design the DMD chip applicable to the present disclosure, and the DMD chip may be implemented based on the hardware structure of the existing DMD chip. Specifically, the multi-region imaging device of each embodiment of the present disclosure may further include a pixel controller for controlling the pixels of the DMD chip. The pixel controller can realize the first effective pixel region and the second effective pixel region of the DMD chip by enabling or disabling the pixels of the DMD chip. For example, the first effective pixel region may be enabled and the second effective pixel region may be disabled; alternatively, the second effective pixel region may be enabled and the first effective pixel region may be disabled; or, the first effective pixel region and the second effective pixel region may be enabled at the same time.

The above-described pixel control process is explained below with reference to the DMD chip shown in FIG. 17. According to the requirements of multi-region projection applications such as vehicle-mounted AR-HUD, a DMD chip 8000 may include a first effective pixel region 8100 corresponding to the first projection region and a second effective pixel region 8200 corresponding to the second projection region. The first effective pixel region 8100 and the second effective pixel region 8200 may be controlled to emit different image lights. For example, the first effective pixel region 8100 may be controlled to emit an image light for synthesizing a sub-frame image of the AR image. The second effective pixel region 8200 may be controlled to emit an image light for generating a sub-frame image of the status indication image. In addition, the first effective pixel region 8100 and the second effective pixel region 8200 may alternatively be collectively controlled to emit image lights for generating a full-frame image.

Pixel control of the DMD chip 8000 may be performed through program coding, so that the DMD chip 8000 is divided into a first effective pixel region 8100 and a second effective pixel region 8200 by software control (rather than hardware design). For example, by means of coding control, the pixels of the first pixel region may be enabled and the pixels of the second pixel region may be disabled; or the pixels of the second pixel region may be enabled, and the pixels of the first pixel region may be disabled; or the pixels in the first pixel region and the pixels in the second pixel region may be enabled at the same time. According to this technical solution, under a condition of not changing the hardware design of the existing DMD chip, software control can be used to realize the sub-region projection of the image light projection plate, so as to finally realize the multi-region projection device. Such a design avoids the high cost of rebuilding the mold.

Figure 17:
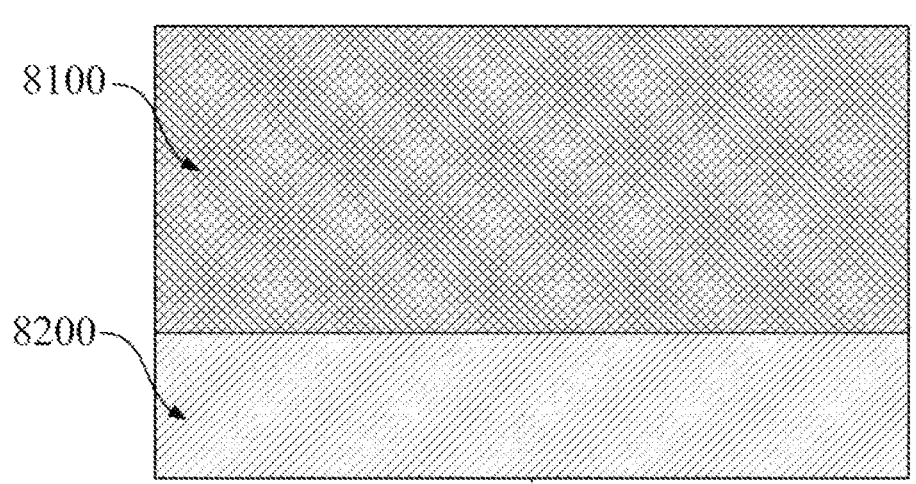
FIG. 17 is a schematic diagram of pixel control of a DMD chip according to an embodiment of the present disclosure.
Figure 18:
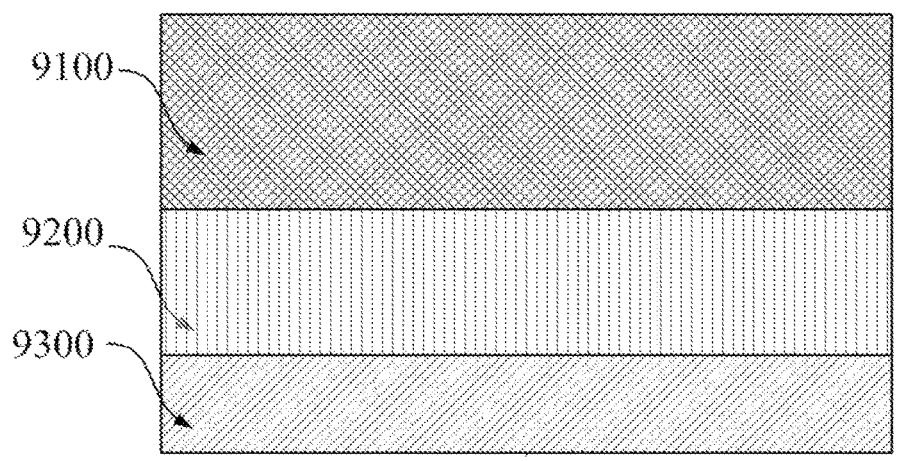
FIG. 18 is a schematic diagram of pixel control of a DMD chip according to another embodiment of the present disclosure.

Different from the DMD chip 8000 shown in FIG. 17, a DMD chip 9000 shown in FIG. 18 may include three effective pixel regions with different region sizes. In addition, the DMD chip may also include a plurality of effective pixel regions with different region sizes. Since the optical path compensation portion may also include a plurality of compensation regions with different optical path compensation amounts, the plurality of compensation regions with different optical path compensation amounts of the optical path compensation portion may be in one-to-one correspondence with the plurality of effective pixel regions with different region sizes in the DMD chip, so as to achieve multi-distance and multi-region imaging.

According to embodiments of the present disclosure, the multi-region projection device may further include a first light diffusing element disposed at the optimal imaging plane of the first image light and a second light diffusing element disposed at the optimal imaging plane of the second image light, and a mechanical structure nay be used to control the turning on or off of the first light diffusing element or the second light diffusing element. Here, a first microstructure unit for diffusing the first imaging light is arranged on the first light diffusing element, and a second microstructure unit for diffusing the second imaging light is arranged on the second light diffusing element. The microstructure unit (diffuser) has the function of imaging display, which can change the divergence angle of light to improve the uniformity and brightness of the image. The microstructure units may be light scattering particles scattered on the light diffusing element, or electroscattering particles that are turned on or off under the stimulation of an external excitation source such as an electric field. For example, in a scenario of AR-HUD, when the pixels in the first pixel region are in an enabled state, the pixels in the second pixel region are in a disabled state, the first microstructure unit is turned on and the second microstructure unit is turned off, a picture of an AR image may be displayed on the first light diffusing element. When the pixels in the second pixel region are in an enabled state, the pixels in the first pixel region are in a disabled state, the second microstructure unit is turned on and the first microstructure unit is turned off, a picture of a status indication image may be displayed on the second light diffusing element.

In addition, the multi-region projection device may further include a third light diffusing element disposed at an imaging plane between the optimal imaging plane closest to the imaging lens group and the optimal imaging plane farthest from the imaging lens group. A third microstructure unit for diffusing a third imaging light is arranged on the third light diffusing element. When the pixels of the first pixel region and the pixels of the second pixel region are enabled at the same time, and the third microstructure unit is turned on, a full-frame image may be displayed on the third light diffusing element. When the DMD chip has a plurality of effective pixel regions with different region sizes, by controlling the enabling and disabling of the pixels of different effective pixels, pictures of various images can be displayed at different distances of the projection device. In addition, a variety of imaging pictures with different distances may be displayed at the same time, and may also be switched and displayed by controlling the pixels of different pixel regions on the DMD chip and the light diffusing elements of the corresponding imaging planes.

According to embodiments of the present disclosure, the multi-region projection device may further include a lens group including a plurality of reflecting mirrors. The mirror may be a freeform mirror or a flat mirror, and is preferably a freeform mirror. The mirror can magnify the image at an imaging carrier. The freeform surface is designed based on the shape of the windshield glass of the vehicle on which the multi-region projection device is installed to reflect the images formed on the first, second and third light diffusing elements onto the windshield glass. This solution is illustrated below with reference to FIG. 19 taking the scenario of the vehicle-mounted AR-HUD as an example.

Figure 19:
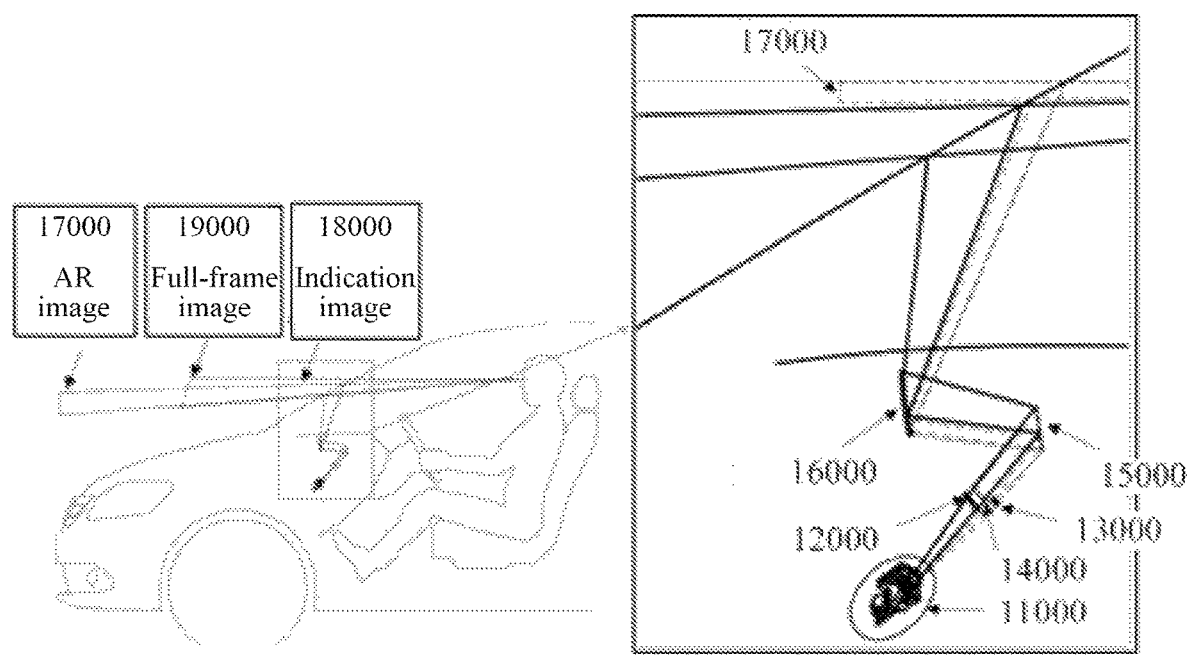
FIG. 19 is a schematic diagram of an AR-HUD projection method according to an embodiment of the present disclosure.

Referring to FIG. 19, the basic structure of a multi-region projection device 10000 may be substantially the same as the multi-region projection device 2000 described above with reference to FIG. 11 or the multi-region projection device 3000 described above with reference to FIG. 12. The image light projection plate, the optical path compensation portion, and the imaging lens group of the multi-region projection device 10000 are collectively described as PGU 11000. The first imaging light, the second imaging light and the third imaging light emitted by the PGU 11000 are respectively imaged on the first light diffusing element 12000, the second light diffusing element 13000 and the third light diffusing element 14000. For example, in a scenario of AR-HUD, the imaging light emitted by the PGU 11000 for generating an AR image is imaged on the first light diffusing element 12000. The imaging light emitted by the PGU 11000 for generating the indication image is imaged on the second light diffusing element 13000. The imaging light emitted by the PGU 11000 for generating a full-frame image is imaged on the third light diffusing element 14000. The multi-region projection device 10000 may further include a lens group. The lens group may be a freeform lens group. The freeform mirror group may sequentially include a small freeform mirror 15000 and a large freeform mirror 16000 along the light propagation paths. The freeform surfaces of the small freeform mirror 15000 and the large freeform mirror 16000 are designed based on the shape of the windshield glass of the vehicle in which the multi-region projection device 10000 is installed, so as to eliminate or reduce various aberrations as much as possible. The small freeform mirror 15000 and the large freeform mirror 16000 reflect the images formed on the first light diffusing element 12000, the second light diffusing element 13000 and the third light diffusing element 14000 onto the windshield glass. Due to the different positions and angles of projection and the different imaging points of the projected images, the driver can perceive the three images at different image depths. For example, a driver may perceive an AR image 17000 providing a deep analysis of the driving environment at a farther imaging point, and an indication image 18000 showing vehicle information at a closer imaging point. When the driver does not need to observe the AR image 17000 and the indication image 18000 of the vehicle information, the full-frame image 19000 may be perceived on an imaging point of the imaging plane between a farther imaging point and a closer imaging point.

Figure 20:
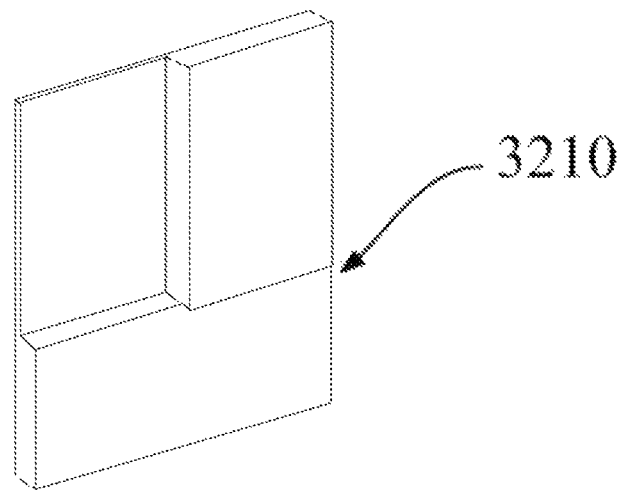
FIG. 20 is a schematic diagram of a structure of an optical path compensation portion according to an embodiment of the present disclosure.
Figure 21:
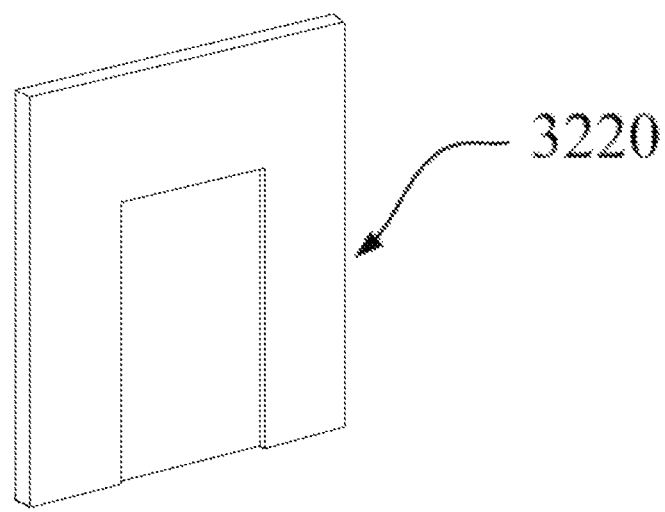
FIG. 21 is a schematic diagram of a structure of an optical path compensation portion according to another embodiment of the present disclosure.

According to the embodiment of the present disclosure, the optical path compensation portion 3200 may further include at least one additional compensation region. Different compensation regions of the optical path compensation portion 3200 have different thicknesses. The shape of the optical path compensation portion 3200 may also be designed as required. For example, the optical path compensation portion 3200 may be designed as a rectangular optical path compensation portion 3210 with three different optical path compensation amounts as shown in FIG. 20 as required. The optical path compensation portion 3200 may be designed as a U-groove shaped or groove shaped optical path compensation portion 3220 with two different optical path compensation amounts as shown in FIG. 21 as required.

Figure 22:
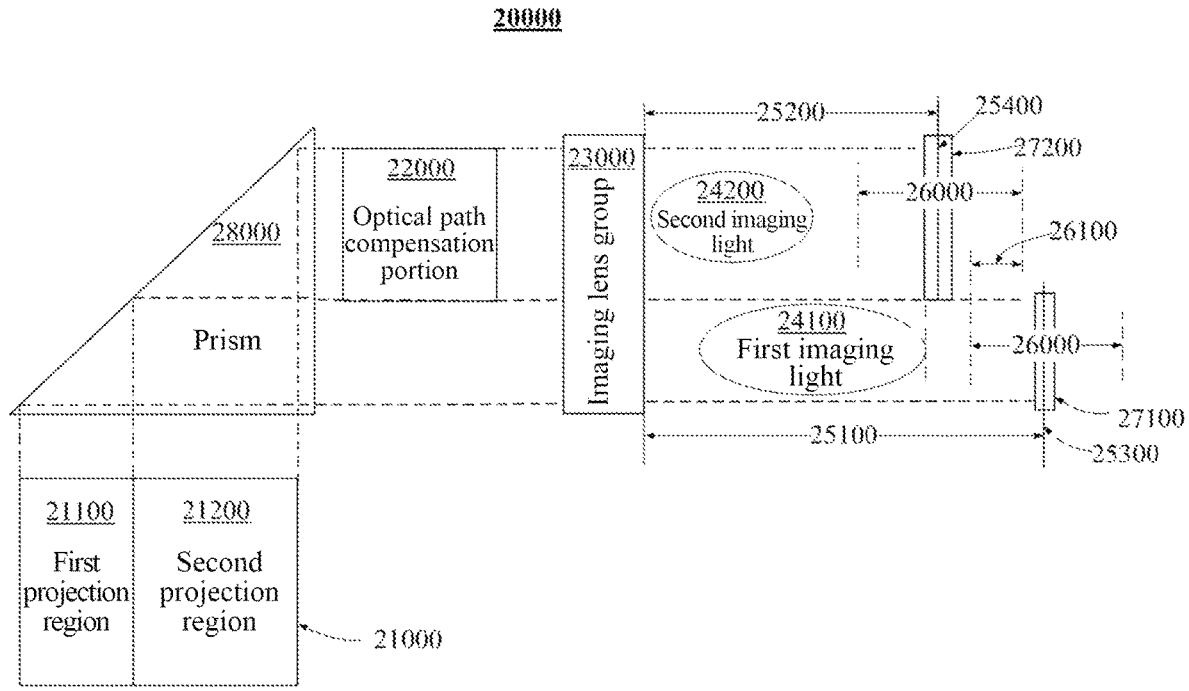
FIG. 22 is a schematic block diagram of a multi-region projection device according to another embodiment of the present disclosure.

FIG. 22 is a schematic block diagram of a multi-region projection device according to another embodiment of the present disclosure.

A multi-region imaging device 20000 includes an image light projection plate 21000, an optical path compensation portion 22000, and an imaging lens group 23000.

The image light projection plate 21000 may include a light source and an image light processing chip (e.g., a DMD chip). The image light projection plate 21000 may further include a first projection region 21100 and a second projection region 21200 that do not overlap each other. The first projection region 21100 and the second projection region 21200 respectively emit image lights for imaging. The image light projection plate 21000 may project different image lights based on digital light signals. In one layout of the image light projection plate 21000, the first projection region 21100 and the second projection region 21200 may be spaced apart from each other by a distance, through a region that does not emit a light. In another layout of the image light projection plate 21000, the first projection region 21100 and the second projection region 21200 may be joined to each other.

The optical path compensation portion 22000 is disposed on the propagation path of the image light emitted by the second projection region 21200, and the image light emitted by the second projection region 21200 is transmitted through the optical path compensation portion 22000 and compensated for the optical path by the optical path length compensation portion 22000. The optical path compensation portion 22000 can adjust the optical path using its material properties, so that the image light transmitted through the optical path compensation portion 22000 and the image light not transmitted through the optical path compensation portion 22000 have different optical paths. Such optical path compensation can cause the image lights emitted from different projection regions to be finally imaged at different distances. In this case, the image light projection plate is used in a partitioned manner, and the optical path compensation portion compensates the optical path of the image light in one of the regions.

The imaging lens group 23000 images the image light emitted by the first projection region 21100 to transmit a first imaging light 24100. In addition, the imaging lens group 23000 also images the image light transmitted by the optical path compensation portion 22000 to transmit a second imaging light 24200. The imaging lens group 23000 may include a series of optical lenses, which are designed and arranged according to imaging requirements.

The first imaging light 24100 may present a clear image within a certain distance from the imaging lens group 23000. Here, an optimal imaging plane 25300 of the first imaging light 24100 is at a first distance 25100 from the imaging lens group 23000. The second imaging light 24200 may present a clear image within a certain distance from the imaging lens group 23000. Here, an optimal imaging plane 25400 of the second imaging light 24200 is at a second distance 25200 from the imaging lens group 23000. The imaging lens group 23000 of the multi-region projection device 20000 of FIG. 22 may have a large imaging depth. For example, an imaging depth 26000 of the imaging lens group 23000 is greater than the difference between the first distance 25100 and the second distance 25200. In this case, as shown in FIG. 22, the first imaging light 24100 may present a clear image within a certain range on the left and right of the optimal imaging plane 25300, and the depth of this range along the direction of the optical axis is the imaging depth 26000 of the imaging lens group 23000. Similarly, the second imaging light 24200 may present a clear image within a certain range on the left and right of the optimal imaging plane 25400, and the depth of this range along the direction of the optical axis is also the imaging depth 26000 of the imaging lens group 23000. When the imaging depth 26000 is large, for example, when the imaging depth 26000 is greater than the difference between the first distance 25100 and the second distance 25200, the range in which the first imaging light 24100 can be clearly imaged and the range in which the second imaging light 24200 can be clearly imaged will overlap each other. In an overlapping region 26100, both the first imaging light 24100 and the second imaging light 24200 can be clearly imaged. By adopting such an imaging lens group 23000 with a large imaging depth, the multi-region projection device 20000 can realize full-frame imaging in the overlapping region 26100. In this case, the multi-region projection device 20000 may utilize the pixels of the image light projection plate 21000 to the maximum extent, and realize a large screen and high resolution.

In addition, the multi-region projection device 20000 shown in FIG. 22 may further include a first light diffusing element 27100 and a second light diffusing element 27200. The first light diffusing element 27100 may be located at the optimal imaging plane 25300 that is separated from the imaging lens group 23000 by the first distance of 25100. The second light diffusing element 27200 may be located at the optimal imaging plane 25400 that is separated from the imaging lens group 23000 by the second distance 25200.

According to embodiments of the present disclosure, in the multi-region projection device shown in FIG. 22, the installation position of the optical path compensation portion 22000 may be the same as the installation position of the optical path compensation portion 3200 as described above.

According to embodiments of the present disclosure, the multi-region projection device shown in FIG. 22 may further include a prism 28000, and the prism 28000 may have the same functions and effects as the aforementioned prism 3800. FIG. 22 shows the multi-region projection device with a prism 28000, however, referring to FIG. 10, the multi-region projection device may not include the prism.

Figure 23:
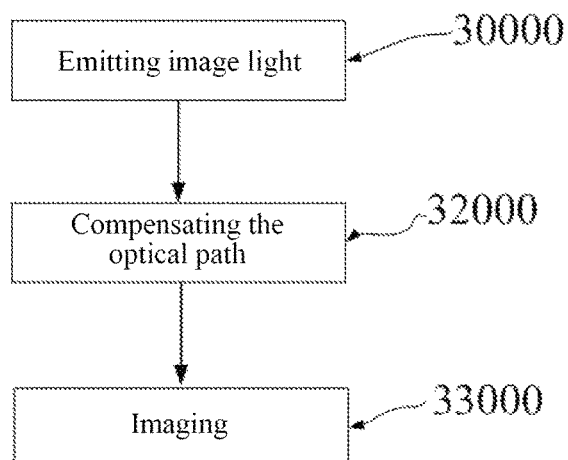
FIG. 23 is a flowchart of a multi-region projection method according to an embodiment of the present disclosure.

FIG. 23 is a flowchart of a multi-region projection method according to an embodiment of the present disclosure.

A multi-region projection method 30000 may include: in operation S31000, respectively emitting image light for imaging with the first projection region and the second projection region of the image light projection plate; in operation S32000, compensating the optical paths of the image lights emitted from the first projection region and the second projection region with the optical path compensation portion disposed on the propagation paths of the image lights, where the optical path compensation portion has a first compensation region and a second compensation region with different compensation amounts, and the first compensation region and the second compensation region correspond to the first projection region and the second projection region respectively; and in operation S33000, imaging the image light transmitted through the first compensation region with the imaging lens group to transmit the first imaging light, and imaging the image light transmitted through the second compensation region to transmit the second imaging light, the first imaging light and the second imaging light having different optimal imaging planes.

According to embodiments of the present disclosure, the optimal imaging plane of the first imaging light is at a first distance from the imaging lens group, the optimal imaging plane of the second imaging light is at a second distance from the imaging lens group, and an imaging depth of the imaging lens group is greater than the absolute value of the difference between the first distance and the second distance.

According to embodiments of the present disclosure, the method may further include: deflecting the image lights emitted by the first projection region and the second projection region with a prism disposed between the image light projecting board and the imaging lens group.

According to embodiments of the present disclosure, the imaging method may further include: emitting an image light for synthesizing an AR image with a first effective pixel region corresponding to the first projection region; and emitting an image light for generating a status indication image with a second effective pixel region corresponding to the second projection region.

According to embodiments of the present disclosure, using the first projection region and the second projection region of the image light projection plate to respectively emit image lights for imaging may include: by enabling pixels in a first effective pixel region and a second effective pixel region of a DMD chip of the image light projection board, controlling the first projection region and the second projection region of the image light projection plate to respectively emit the image lights for imaging.

According to embodiments of the present disclosure, the multi-region projection method may further include: reflecting the first imaging light and the second imaging light to an imaging position with a plurality of mirrors.

The above mainly takes the vehicle-mounted HUD as an example to describe the multi-region imaging device and method according to embodiments of the present disclosure. However, those skilled in the art may know that, without departing from the technical concept taught in the present disclosure, the above solutions may also be applied to various imaging scenarios. For example, multi-imaging-distance co-imaging can also be applied to smart headlights, projectors, laser TVs, and the like.

The foregoing is only a description for the embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, such as, technical solutions formed by replacing the features as disclosed in the present disclosure with (but not limited to) technical features with similar functions.

What is claimed is:

1. A multi-region projection device, wherein the multi-region projection device comprises:
   an image light projection plate, wherein the image light projection plate comprises a first projection region and a second projection region, and the first projection region and the second projection region emit image lights for imaging;
   an optical path compensation portion, wherein the optical path compensation portion is disposed on a propagation path of the image lights, the optical path compensation portion comprises a first compensation region and a second compensation region with different optical path compensation amounts, and the first compensation region and the second compensation region correspond to the first projection region and the second projection region, respectively; and
   an imaging lens group, wherein the imaging lens group images the image light transmitted through the first compensation region to transmit a first imaging light, and images the image light transmitted through the second compensation region to transmit a second imaging light;
   wherein an optimal imaging plane of the first imaging light is at a first distance from the imaging lens group, an optimal imaging plane of the second imaging light is at a second distance from the imaging lens group, and an imaging depth of the imaging lens group is greater than an absolute value of a difference between the first distance and the second distance.

2. The multi-region projection device according to claim 1, wherein the multi-region projection device further comprises a prism, the prism is disposed between the image light projection plate and the imaging lens group, and the image lights emitted from the first projection region and the second projection region are deflected by the prism and then exit.

3. The multi-region projection device according to claim 1, wherein the optical path compensation portion further comprises at least one additional compensation region, the image light projection plate further comprises at least one additional projection region, and the additional compensation region corresponds to the additional projection region.

4. The multi-region projection device according to claim 2, wherein the optical path compensation portion is attached to a light incident surface or a light exit surface of the prism; or the optical path compensation portion is disposed between a light incident surface of the prism and the image light projection plate, and is spaced apart from the prism and the image light projection plate; or the optical path compensation portion is disposed between a light exit surface of the prism and the imaging lens group, and is spaced apart from the prism and the imaging lens group; or the optical path compensation portion is integrally formed with the light incident surface or the light exit surface of the prism; or the optical path compensation portion is attached to the image light projection plate.

5. The multi-region projection device according to claim 1, wherein the image light projection plate comprises a DMD chip, and the DMD chip comprises a first effective pixel corresponding to the first projection region and a second effective pixel region corresponding to the second projection region, wherein the first effective pixel region emits an image light for synthesizing an AR image, and the second effective pixel region emits an image light for generating a status indication image.

6. The multi-region projection device of claim 5, wherein the first effective pixel region and the second effective pixel region jointly emit image lights for generating a full-frame image.

7. The multi-region projection device according to claim 5, wherein the multi-region projection device further comprises a pixel controller, the pixel controller controls the first effective pixel region and the second effective pixel region of the DMD chip to emit the image lights by enabling and disabling pixels of the DMD chip.

8. The multi-region projection device according to claim 1, wherein the multi-region projection device further comprises a first light diffusing element disposed at the first distance and a second light diffusing element disposed at the second distance.

9. A multi-region projection device, wherein the multi-region projection device comprises:
   an image light projection plate, wherein the image light projection plate comprises a first projection region and a second projection region, and the first projection region and the second projection region emit image lights for imaging;
   an optical path compensation portion, wherein the optical path compensation portion is disposed on a propagation path of the image light emitted by the second projection region, and the image light emitted by the second projection region transmits through the optical path compensation portion and is compensated for an optical path; and
   an imaging lens group, wherein the imaging lens group images the image light projected by the first projection region to transmit a first imaging light, and images the image light transmitted through the second compensation region to transmit a second imaging light, wherein, an optimal imaging plane of the first imaging light is at a first distance from the imaging lens group, an optimal imaging plane of the second imaging light is at a second distance from the imaging lens group, and an imaging depth of the imaging lens group is greater than a difference between the first distance and the second distance.

10. The multi-region projection device according to claim 9, wherein the multi-region projection device further comprises a prism, the prism is disposed between the image light projection plate and the imaging lens group, and the image lights emitted from the first projection region and the second projection region are deflected by the prism and then exit.

11. The multi-region projection device according to claim 9, wherein the optical path compensation portion further comprises at least one additional compensation region, the image light projection plate further comprises at least one additional projection region, and the additional compensation region corresponds to the additional projection region.

12. The multi-region projection device according to claim 9, wherein the optical path compensation portion is disposed between the image light projection plate and the imaging lens group.

13. The multi-region projection device according to claim 10, wherein the optical path compensation portion is disposed between a light incident surface of the prism and the image light projection plate, and is spaced apart from the prism and the image light projection plate; or the optical path compensation portion is disposed between a light exit surface of the prism and the imaging lens group, and is spaced apart from the prism and the imaging lens group; or the optical path compensation portion is attached to the light incident surface or the light exit surface of the prism.

14. The multi-region projection device according to claim 9, wherein,
   the image light projection plate further comprises at least one image light region different from the first region and the second region, the at least one image light region emits an image light for imaging; and
   the imaging lens group images the image light emitted by the at least one image light region to transmit a third imaging light.

15. The multi-region projection device according to claim 9, wherein the image light projection plate comprises a DMD chip, and the DMD chip comprises effective pixel regions corresponding to the first projection region and the second projection region.

16. The multi-region projection device according to claim 15, wherein the effective pixel region corresponding to the first projection region emits an image light for synthesizing an AR image, and the effective pixel region corresponding to the second projection region emits an image light for generating a status indication image.

17. The multi-region projection device according to claim 15, wherein the multi-region imaging device further comprises a pixel controller, and the pixel controller realize the effective pixel regions and a non-effective pixel region of the DMD chip by enabling or disabling pixels of the DMD chip.

18. The multi-region projection device according to claim 9, wherein the optical path compensation portion comprises a flat glass, a compensation lens or an optical lens group.

19. The multi-region projection device according to claim 15, wherein the multi-region imaging device further comprises a freeform mirror group, the freeform mirror group comprising a plurality of mirrors with a freeform surface, the freeform surface is designed based on a shape of a windshield glass of a vehicle on which the multi-region imaging device is installed, so as to reflect images formed on a first imaging plane and a second imaging plane onto the windshield glass.

* * * * *